United States Patent
Vakili

(10) Patent No.: US 10,855,454 B1
(45) Date of Patent: Dec. 1, 2020

(54) SYSTEMS AND METHODS FOR QUANTUM SESSION AUTHENTICATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Franciso, CA (US)

( * ) Notice: Subject to any disclaimer, the term of this patent is extended or adjusted under 35 U.S.C. 154(b) by 63 days.

(21) Appl. No.: 16/105,409

(22) Filed: Aug. 20, 2018

Related U.S. Application Data

(63) Continuation-in-part of application No. 15/916,763, filed on Mar. 9, 2018.

(51) Int. Cl.
*H04L 29/06* (2006.01)
*H04L 9/08* (2006.01)
*G06F 7/58* (2006.01)

(52) U.S. Cl.
CPC .......... *H04L 9/0844* (2013.01); *H04L 9/0852* (2013.01); *H04L 9/0869* (2013.01); *G06F 7/582* (2013.01)

(58) Field of Classification Search
None
See application file for complete search history.

(56) References Cited

U.S. PATENT DOCUMENTS

| | | | |
|---|---|---|---|
| 5,515,438 A | 5/1996 | Bennett et al. | |
| 7,324,647 B1 | 1/2008 | Elliott | |
| 7,333,611 B1 | 2/2008 | Yuen et al. | |
| 7,460,669 B2 | 12/2008 | Foden et al. | |
| 7,649,996 B2 | 1/2010 | Nishioka et al. | |
| 7,697,693 B1 | 4/2010 | Elliott | |
| 7,787,628 B2 | 8/2010 | Kuang et al. | |
| 8,332,730 B2 | 12/2012 | Harrison et al. | |
| 8,693,691 B2 | 4/2014 | Jacobs | |

(Continued)

FOREIGN PATENT DOCUMENTS

| | | |
|---|---|---|
| CN | 107040378 A | 8/2017 |
| WO | 2017/108539 A1 | 6/2017 |

OTHER PUBLICATIONS

Ronczka, John. Backchanneling Quantum Bit (Qubit) 'Shuffling': Quantum Bit (Qubit) 'Shuffling' as Added Security by Slipstreaming Q-Morse. 2016 3rd Asia-Pacific World Congress on Computer Science and Engineering (APWC on CSE). https://ieeexplore.ieee.org/stamp/stamp.jsp?tp=&arnumber=7941948 (Year: 2016).*

(Continued)

*Primary Examiner* — Jeremiah L Avery
(74) *Attorney, Agent, or Firm* — Alston & Bird LLP

(57) ABSTRACT

Systems, apparatuses, methods, and computer program products are disclosed for session authentication. An example method includes receiving, by decoding circuitry and over a quantum line, a set of qbits generated based on a first set of quantum bases. The example method further includes decoding, by the decoding circuitry and based on a second set of quantum bases, the set of qbits to generate a decoded set of bits comprising at least one wildcard bit. The example method further includes generating, by session authentication circuitry, a session key based on the decoded set of bits, wherein the session key is generated based at least in part on the at least one wildcard bit.

20 Claims, 8 Drawing Sheets

(56) References Cited

U.S. PATENT DOCUMENTS

| | | | |
|---|---|---|---|
| 8,755,525 | B2 | 6/2014 | Wiseman |
| 8,855,316 | B2* | 10/2014 | Wiseman ............... H04L 9/0855 380/278 |
| 9,036,817 | B1 | 5/2015 | Hunt et al. |
| 9,083,684 | B2 | 7/2015 | Tanizawa et al. |
| 9,184,912 | B2 | 11/2015 | Harrington |
| 9,191,198 | B2 | 11/2015 | Harrison et al. |
| 9,680,640 | B2 | 6/2017 | Hughes et al. |
| 9,692,595 | B2* | 6/2017 | Lowans ............... H04L 9/0838 |
| 10,439,806 | B2 | 10/2019 | Fu et al. |
| 10,540,146 | B1 | 1/2020 | Vakili |
| 10,587,402 | B2 | 3/2020 | Nordholt et al. |
| 2004/0109564 | A1 | 6/2004 | Cerf et al. |
| 2004/0238813 | A1 | 12/2004 | Lidar et al. |
| 2005/0036624 | A1 | 2/2005 | Kent et al. |
| 2005/0249352 | A1 | 11/2005 | Choi et al. |
| 2006/0056630 | A1 | 3/2006 | Zimmer et al. |
| 2006/0263096 | A1 | 11/2006 | Dinu et al. |
| 2007/0260658 | A1 | 11/2007 | Fiorentino et al. |
| 2008/0076525 | A1 | 3/2008 | Kim |
| 2009/0180615 | A1 | 7/2009 | Trifonov |
| 2011/0123011 | A1 | 5/2011 | Choi et al. |
| 2011/0173696 | A1 | 7/2011 | Dynes et al. |
| 2011/0213979 | A1 | 9/2011 | Wiseman et al. |
| 2013/0083926 | A1 | 4/2013 | Hughes et al. |
| 2013/0101119 | A1 | 4/2013 | Nordholt et al. |
| 2013/0101121 | A1 | 4/2013 | Nordholt et al. |
| 2013/0163759 | A1 | 6/2013 | Harrison et al. |
| 2013/0251145 | A1 | 9/2013 | Lowans et al. |
| 2013/0315395 | A1* | 11/2013 | Jacobs ............... H04L 9/0852 380/278 |
| 2015/0188701 | A1 | 7/2015 | Nordholt et al. |
| 2015/0222619 | A1 | 8/2015 | Hughes et al. |
| 2016/0028542 | A1 | 1/2016 | Choi et al. |
| 2016/0248586 | A1 | 8/2016 | Hughes et al. |
| 2016/0328211 | A1 | 11/2016 | Nordholt et al. |
| 2016/0352515 | A1 | 12/2016 | Bunandar et al. |
| 2017/0126654 | A1 | 5/2017 | Fu |
| 2017/0214525 | A1 | 7/2017 | Zhao et al. |
| 2017/0222731 | A1 | 8/2017 | Lucamarini et al. |
| 2017/0324551 | A1 | 11/2017 | Ahn |
| 2017/0324552 | A1 | 11/2017 | Ahn |
| 2017/0331623 | A1 | 11/2017 | Fu et al. |
| 2017/0338951 | A1 | 11/2017 | Fu et al. |
| 2017/0338952 | A1 | 11/2017 | Hong et al. |
| 2018/0069698 | A1 | 3/2018 | Hong et al. |
| 2018/0198608 | A1 | 7/2018 | Nordholt et al. |
| 2018/0269989 | A1 | 9/2018 | Murakam et al. |
| 2019/0007215 | A1 | 1/2019 | Hakuta et al. |
| 2019/0020469 | A1 | 1/2019 | Dottax et al. |
| 2019/0129694 | A1 | 5/2019 | Benton et al. |
| 2019/0238326 | A1 | 8/2019 | Ji et al. |
| 2019/0243611 | A1 | 8/2019 | Martin et al. |
| 2019/0268146 | A1* | 8/2019 | Samid ............... H04L 9/0852 |
| 2019/0289006 | A1 | 9/2019 | Fang et al. |
| 2020/0153619 | A1 | 5/2020 | Ribordy |

OTHER PUBLICATIONS

Liu, Zhihao et al. Mutually Authenticated Quantum Key Distribution Based on Entanglement Swapping. 2009 Pacific-Asia Conference on Circuits, Communications and Systems. https://ieeexplore.ieee.org/stamp/stamp.jsp?tp=&arnunnber=5232366 (Year: 2009).*

Armanuzzaman, Md. et al. A Secure and Efficient Data Transmission Technique Using Quantum Key Distribution. 2017 4th International Conference on Networking, Systems and Security (NSysS). https://ieeexplore.ieee.org/stamp/stamp.jsp?tp=& arnumber= 8267797 (Year: 2017).*

Elboukhari, Mohamed et al. Implementation of secure key distribution based on quantum cryptography. 2009 International Conference on Multimedia Computing and Systems. https://ieeexplore.ieee.org/stamp/stamp.jsp?tp=&arnumber=5256673 (Year: 2009).*

Thangavel, T. S.; Krishnan, A. Performance of integrated quantum and classical cryptographic model for password authentication. https://ieeexplore.ieee.org/stamp/stamp.jsp?tp=&arnumber=5591718 (Year: 2010).*

Non-Final Office Action dated Jan. 16, 2020 for U.S. Appl. No. 16/712,338.

Charjan, S. et al., "Quantum Key Distribution by Exploitation Public Key Cryptography (ECC) In Resource Constrained Devices," International Journal of Emerging Engineering Research and Technology, 3(7): 5-12, (2015).

Non-Final Rejection for U.S. Appl. No. 15/916,763, dated Oct. 30, 2019.

Non-Final Rejection for U.S. Appl. No. 16/105,294, dated Nov. 12, 2019.

Non-Final Rejection for U.S. Appl. No. 16/105,370, dated Nov. 8, 2019.

Pandya, M., "Securing Clouds—The Quantum Way," arXiv preprint arXiv:1512.02196, 16 pages, (2015).

Sirdhar, S. et al., Intelligent Security Framework for IoT Devices Cryptography based End-To-End security Architecture, International Conference on Inventive Systems and Control (ICISC—2017) 1-5.

Mohammad, Omer K. et al., Statistical Analysis for Random Bits Generation on Quantum Key Distribution, Cyber Warfare and Digital Forensic (CyberSec), 2014 Third International Conference (2014) 45-51.

Liu, D. et al., A Communication Model in Multilevel Security Network Using Quantum Key, Chinese Automation Congress (CAC) (2015) 915-918.

Hong, K. W. et al., Challenges in Quantum Key Distribution: A Review, ACM Proceeding (2016) 29-33.

Debuisschert, T. et al., Strenghtening Classical Symmetric Encryption with Continuous Variable Quantum Key Distribution, CLEO Technical Digest, OSA (2012), 2 pages.

Abubakar, M. Y. et al., Two Channel Quantum Security Modelling Focusing on Quantum Key Distribution Technique, IT Convergence and Security (ICITCS), 2015 5th International Conference (2015) 5 pages.

Garcia-Escartin, Juan Carlos; Chamorro-Posada, Pedro. Hidden Probe Attacks on Ultralong Fiber Laser Key Distribution Systems. IEEE Journal of Selected Topics in Quantum Electronics (Volume: 24 , Issue: 3 , May-Jun. 2018). https://ieeexplore.ieee.org/stamp/stamp.jsp?tp=&arnumber=8219358 (Year: 2018).

Imany, Poolad et al. Demonstration of frequency-bin entanglement in an integrated optical microresonator. 2017 Conference on Lasers and Electro-Optics (CLEO). https://ieeexplore.ieee.org/stamp/stamp.jsp?tp=&arnumber=8083593 (Year: 2017).

Price, Alasdair B. et al. High-Speed Quantum Key Distribution with Wavelength-Division Multiplexing on Integrated Photonic Devices. 2018 Conference on Lasers and Electro-Optics (CLEO). https://ieeexplore.ieee.org/stamp/stamp.jsp?tp=&arnumber= 8426886 (Year: 2018).

Bienfang, J.C. et al. Quantum generated one-time-pad encryption with 1.25 Gbps clock synchronization. 2005 OFC/NFOEC Technical Digest. Optical Fiber Communication Conference. https://ieeexplore.ieee.org/stamp/stamp.jsp?tp=&arnumber=1501276 (Year: 2005).

Chen, Wei et al. Field Experiment on a "Star Type" Metropolitan Quantum Key Distribution Network. IEEE Photonics Technology Letters, vol. 21, Issue: 9. https://ieeexplore.ieee.org/stamp/stamp.isp?tp=&arnumber=4787043 (Year: 2009).

* cited by examiner

| | First Set of Bits | 1 | 1 | 0 | 0 | 0 | 1 | 1 | 0 |
|---|---|---|---|---|---|---|---|---|---|
| First Optoelectronic Device | Quantum Basis Used to Encode Set of Qbits | First | First | First | First | First | First | First | First |
| Second Optoelectronic Device | Quantum Basis Used to Decode Set of Qbits | First | Second | First | Second | First | Second | First | Second |
| | Second Set of Bits | 1 | 0 | 0 | 0 | 0 | 0 | 1 | 0 |
| | Correctness | Correct | Error | Correct | Correct | Correct | Error | Correct | Correct |

402
GENERATE, BY A QBIT ENCODER, A SET OF QBITS BY ENCODING A FIRST SET OF BITS BASED ON A FIRST SET OF QUANTUM BASES

404
TRANSMIT THE SET OF QBITS OVER A QUANTUM LINE TO A QBIT DECODER

406
RECEIVING, BY THE QBIT DECODER, THE SET OF QBITS OVER THE QUANTUM LINE FROM THE QBIT ENCODER

408
GENERATE, BY THE QBIT DECODER, A SECOND SET OF BITS BY DECODING THE SET OF QBITS BASED ON A SECOND SET OF QUANTUM BASES DIFFERENT FROM THE FIRST SET OF QUANTUM BASES

410
GENERATE, BY A SESSION AUTHENTICATION SYSTEM, A NUMBER BASED ON THE SECOND SET OF BITS

412
GENERATE, BY THE SESSION AUTHENTICATION SYSTEM, A SESSION KEY BASED ON THE GENERATED NUMBER

FIG. 4

SYSTEMS AND METHODS FOR QUANTUM SESSION AUTHENTICATION

CROSS-REFERENCE TO RELATED APPLICATIONS

This application is a continuation-in-part of U.S. application Ser. No. 15/916,763, filed Mar. 9, 2018, the entire contents of which are incorporated herein by reference.

TECHNOLOGICAL FIELD

Example embodiments of the present disclosure relate generally to session authentication and, more particularly, to systems and methods for quantum session authentication.

BACKGROUND

Session authentication may describe various techniques for securing electronic communications between two computing devices, such as a server device and a client device, using a unique session key or identifier (ID). Selecting a session key that cannot be guessed is thus an important element of preventing attacks whereby a perpetrator derives the session key and then uses it to intercept communications by tapping into the communication path between the server device and the client device.

Generating session IDs to be used in session authentication often relies upon the use of pseudo-random number generation. While often referred to as "random number generation," in truth it has historically been difficult to generate truly random numbers, and tools for "random" number generation have usually employed procedures whose outputs can be reproduced if certain underlying inputs are known. And while historically such pseudo-random number generation has been sufficient to generate session IDs that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, because perpetrators have a greater ability to determine the method by which a session key is pseudo-randomly generated, replicate the method to generate the same session key, and then break into a user's session.

BRIEF SUMMARY

Systems, apparatuses, methods, and computer program products are disclosed herein for improved session authentication. The session authentication system provided herein solves the above problems by encoding and decoding quantum bits (qbits) using different sets of quantum bases in order to inject true randomness into the process for generating a session key or a seed for a pseudorandom number generation process used to establish a secure session.

In one example embodiment, a system is provided for session authentication. The system comprises decoding circuitry configured to receive, over a quantum line, a set of qbits generated based on a first set of quantum bases. The decoding circuitry is further configured to decode, based on a second set of quantum bases, the set of qbits to generate a decoded set of bits comprising at least one wildcard bit. In some embodiments, the system further comprises session authentication circuitry configured to generate a session key based on the decoded set of bits, wherein the session key is generated based at least in part on the at least one wildcard bit. In some embodiments, the system employs a single device comprising the decoding circuitry and the session authentication circuitry, while in other embodiments the system comprises multiple devices that comprise the decoding circuitry and the session authentication circuitry.

In another example embodiment, a method is provided for session authentication. The method comprises receiving, by decoding circuitry and over a quantum line, a set of qbits generated based on a first set of quantum bases. The method may further comprise decoding, by the decoding circuitry and based on a second set of quantum bases, the set of qbits to generate a decoded set of bits comprising at least one wildcard bit. The method may further comprise generating, by session authentication circuitry, a session key based on the decoded set of bits, wherein the session key is generated based at least in part on the at least one wildcard bit.

In another example embodiment, a computer program product is provided for session authentication. The computer program product includes at least one non-transitory computer-readable storage medium storing program instructions that, when executed, cause an apparatus to receive, over a quantum line, a set of qbits generated based on a first set of quantum bases. The program instructions, when executed, further cause the apparatus to decode, based on a second set of quantum bases, the set of qbits to generate a decoded set of bits comprising at least one wildcard bit. The program instructions, when executed, may further cause the apparatus to generate a session key based on the decoded set of bits, wherein the session key is generated based at least in part on the at least one wildcard bit.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

FIG. 3 illustrates example sets of bits and quantum bases in accordance with some example embodiments described herein; and FIG. 4 illustrates an example flowchart for session authentication in accordance with some example embodiments described herein.

DETAILED DESCRIPTION

Figure 1:
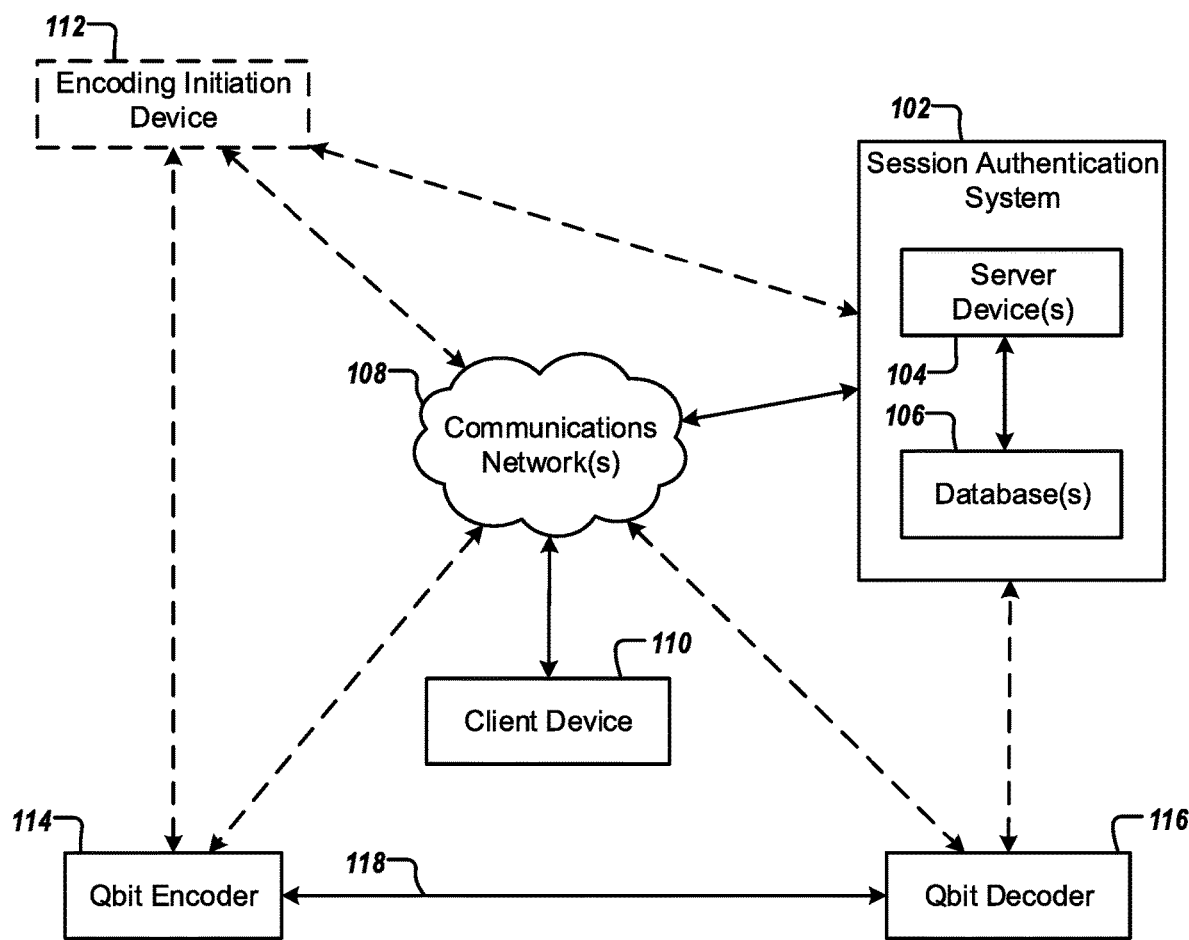
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for session authentication. Traditionally, it has been very difficult to select or generate a robust session key or ID (i.e., a unique number that is unlikely to be guessed or deciphered by a third party). In addition, there is typically no way to prove that the session ID is unattainable by a third party perpetrator. In an attempt to transmit session IDs that are unattainable by a perpetrator, quantum key distribution (QKD) systems have been developed. In general terms, QKD systems exchange keys between two parties in a secure way that cannot be guessed. For instance, a one-time-pad quantum key exchange is impenetrable because a potential perpetrator eavesdropping on the transmission of a set of qbits representing a key will necessarily induce errors in the set of qbits due to quantum uncertainty, alerting the two parties to the attempted eavesdropping.

In contrast to these conventional QKD systems for transmitting secret keys securely, the present disclosure relates to a mechanism for generating unique keys in the first place. To do this, a session authentication system encodes and decodes a set of quantum bits (i.e., qbits) using different quantum bases in order to generate a random number used to generate a session key or a random seed (e.g., a set of bits that is randomized due to quantum effects such as the principle of quantum uncertainty) for pseudorandom number generation used to establish a secure session. When a bit is encoded into a qbit using a first quantum basis and decoded using the first quantum basis, the original bit is recreated. However, the nature of quantum uncertainty and the indeterminacy of quantum states establishes that decoding the qbit using a second quantum basis different from the first quantum basis will generate a bit that has some probability of being different than the original bit. As such, by ensuring that different quantum bases are used when encoding and decoding at least some of the set of qbits in a transmission, the session authentication system disclosed herein introduces random errors in the decoded bits based on quantum uncertainty and the indeterminacy of quantum states. These random errors can then prevent the reproduction of session keys by malicious attackers.

The present disclosure thus provides improved session authentication techniques by encoding and decoding quantum bits (qbits) using different sets of quantum bases in order to randomly generate a number that may be used to generate a session key or that may comprise a random seed for pseudorandom number generation used to establish a secure session. In one illustrative example, the present disclosure provides for encoding, by a qbit encoder (e.g., a first optoelectronic device such as a polarized light modulator (PLM)), a sequence of bits using varied quantum bases to generate a sequence of qbits. The quantum bases may comprise, for instance, the horizontal photon polarization state |0> and the vertical photon polarization state |1>. The quantum bases may alternatively or in addition comprise the left circular photon polarization state |L> and the right circular photon polarization state |R>, which are linear combinations of the vertical and horizontal photon polarization states |0> and |1>. Subsequently, the present disclosure provides for transmitting the sequence of qbits from the qbit encoder to a qbit decoder (e.g., a second optoelectronic device such as a polarized light demodulator (PLD)). In some instances, the present disclosure provides for generating, by the qbit decoder, a sequence of random bits by decoding (e.g., measuring) the received sequence of qbits using arbitrary quantum bases that will thus not match the quantum bases used to encode the sequence of qbits, and which will thus introduce random errors in the set of decoded bits based on quantum uncertainty. The present disclosure then provides for using the sequence of random bits as a random number used to generate a session key or as a seed for pseudorandom number generation in session authentication.

In some embodiments, the present disclosure provides for generating a number of bits at a first device (e.g., a server device), encoding the number of bits as quantum bits using a randomly-determined set of quantum bases, transmitting the quantum bits to a second device (e.g., a client device), decoding (e.g., measuring) the quantum bits at the second device using an arbitrarily-determined quantum basis, and using the decoded bits as a seed for pseudo-random number generation in session authentication. The first device and the second device may include a respective qbit encoder and qbit decoder, such that the first and second devices can together perform the encoding and decoding functions contemplated herein. In other embodiments, the first device is connected to a separate qbit encoder while the second device is connected to a separate qbit decoder, such that the first and second devices do not perform the qbit encoding or decoding directly, but are in communication with the devices that do perform these functions. In yet other implementations, the first device includes the qbit encoder while the second device relies upon a separate qbit decoder, or the first device relies upon a separate qbit encoder while the second device comprises a qbit decoder. In any event, it will be understood that while the qbit encoding and decoding functions may be performed by the first and second devices or by separate devices connected thereto, the second device is nevertheless configured to subsequently use the set of decoded bits for session ID creation (or for any other purpose).

In some embodiments, the session authentication system generates a random number by transmitting a sequence of bits, with each bit being encoded as a quantum state. For instance, the |0> and |1> states may correspond to horizontal and vertical photon polarization states, while the |L> and |R> states may correspond to the two circular photon polarization states. Thus, each state is an indication of a bit and referred to herein as a "qbit." In some embodiments, the session authentication system generates a session ID that is truly random based on the random number generated by the session authentication system. In some embodiments, the session authentication system uses this random number to generate a seed for the PRNG that is completely unknown. In some embodiments, the session authentication system generates a number (n) of qbits in different quantum bases. For instance, two different quantum bases could be the horizontal and vertical polarization states and the two circular photon polarization states, which are linear combinations of the vertical and horizontal photon polarization states. In some embodiments, the session authentication system then transmits the generated qbits from the qbit encoder to the qbit decoder over a quantum line. The qbit encoder and the qbit decoder may, as noted above, be in communication or integrated with any two computing devices involved in session ID generation, such as an encoding initiation device and a session authentication system, as shown in FIG. 1.

In some embodiments, the qbit decoder does not know the basis in which these qbits were encoded (i.e., the qbit encoder does not know if these qbits were encoded using the |0>, |1> states or the |L>, |R> states, or any other quantum states). The qbit decoder uses its own set of quantum bases to measure these states. In some instances, the bases used by the qbit decoder are sets of bases arbitrarily determined independent of the quantum bases used to encode the qbits. According to the quantum uncertainty of the states, each time the qbit decoder uses a different basis, it has a probability (e.g., a fifty percent chance) of measuring the bit that was originally encoded. As a result, the bit pattern generated by the qbit decoder upon decoding (e.g., measuring) the qbits is inherently random and may be used as a random number for any purpose, e.g., as a session ID or a seed for a PRNG. The random number cannot be reproduced by any perpetrator due to the probabilistic effects of quantum uncertainty, even if the perpetrator knows the original bits that were transmitted.

There are many advantages of these and other embodiments described herein, such as: providing a session key that has truly random elements, and, as a result, facilitating the generation of a session ID that cannot be reproduced by a third party.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, such as pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "quantum line" refers to a quantum communications path. For example, a quantum line may comprise an optical fiber, a polarization-maintaining optical fiber (PMF or PM fiber), an optical waveguide, a fiber optic cable, free space (e.g., air, vacuum), or a combination thereof.

The terms "qbit encoder" and "qbit decoder" are used herein to refer to any devices that respectively encode or decode a qbit of information on a photon. In this regard, the qbit encoder and qbit decoder may comprise optoelectronic devices as described below.

The terms "optoelectronic device" and "optoelectronic component" are used herein to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), or a semiconductor laser; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, filter, mirror, window, diffuser, prism, beamsplitter, polarizer, or diffraction grating; any device configured to function as any of the foregoing devices; or any combination thereof. In one example, an optoelectronic device may include one or more photodetectors configured to measure qbits received over a quantum line. In yet another example, an optoelectronic device may include one or more LEDs. In yet another example, an optoelectronic device may include one or more laser devices.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more qbit encoders, qbit decoders, PRNG generating devices, servers, remote servers, cloud-based servers (e.g., cloud utilities), or other devices.

FIG. 1 illustrates a system diagram of a set of devices that may be involved in some example embodiments described herein. In this regard, FIG. 1 discloses an example environment 100 within which embodiments of the present disclosure may operate to authenticate sessions between devices. As illustrated, a session authentication system 102 may include one or more session authentication system server devices 104 in communication with one or more session authentication system databases 106. The session authentication system 102 may be connected to one or more client devices 110 through a communications network 108, and may generate session IDs for secure authentication of communication sessions between any of the one or more client devices 110 and one or more other devices (e.g., one or more session authentication system server devices 104, or one or more other devices not shown in FIG. 1). To generate a particular session ID, the session authentication system 102 may invoke use of the encoding initiation device 112, qbit encoder 114, and qbit decoder 116, as described below.

The session authentication system 102 may be embodied as one or more computers or computing systems as known in the art. The one or more session authentication system server devices 104 may be embodied as one or more servers, remote servers, cloud-based servers (e.g., cloud utilities), processors, or any other suitable server devices, or any combination thereof. The one or more session authentication system server devices 104 receive, process, generate, and transmit data, signals, and electronic information to facilitate the operations of the session authentication system 102. The one or more session authentication system databases 106 may be embodied as one or more data storage devices, such as a Network Attached Storage (NAS) device or devices, or as one or more separate databases or servers. The one or more session authentication system databases 106 include information accessed and stored by the session authentication system 102 to facilitate the operations of the session authentication system 102. For example, the one or more session authentication system databases 106 may store quantum bases, control signals, device characteristics, and user account credentials for qbit decoder 116, and may store device characteristics and user account credentials for one or more of the client devices 110.

The encoding initiation device 112 may be embodied as one or more computers or computing systems as known in the art. For instance, the encoding initiation device 112 may be embodied as one or more servers, remote servers, cloud-based servers (e.g., cloud utilities), processors, or any other suitable server devices, or any combination thereof. The encoding initiation device 112 may in some embodiments be connected the session authentication system 102 either directly or via one or more communications networks 108. In some embodiments (not shown in FIG. 1), the encoding initiation device 112 may be a component of the session authentication system 102. However, in other embodiments, the encoding initiation device 112 is not a part of or connected, directly or indirectly, to the session authentication system 102 in order to prevent communication of information regarding the qbit encoding or decoding procedures outlined herein between the encoding initiation device 112 and the session authentication system 102. The encoding initiation device 112 may include one or more databases (not shown in FIG. 1) storing a first set quantum bases, control signals, device characteristics, and user account credentials for qbit encoder 114.

The encoding initiation device 112 may be connected to qbit encoder 114. In various embodiments, this connection may be through the one or more communications networks 108, although also this connection may alternatively be a direct connection through a non-network communications path. In some embodiments, the qbit encoder 114 may be a component of the encoding initiation device 112 rather than a separate device, although it is illustrated as a separate device in FIG. 1 for ease of explanation. Qbit encoder 114, in turn, is connected to qbit decoder 116 through one or more quantum lines 118. Qbit decoder 116, in turn, may be connected to session authentication system 102. In various embodiments, this connection may be through the one or more communications networks 108, although also this connection may alternatively be a direct connection. In some embodiments, the qbit decoder 116 may be a component of the session authentication system 102 rather than a separate device, although it is illustrated as a separate device in FIG. 1 for ease of explanation.

The qbit encoder 114 may be embodied by any suitable qbit encoder, such as an optoelectronic device (e.g., a PLM). In some embodiments, the qbit encoder 114 may include or store various data and electronic information. For example, the qbit encoder 114 may include or store one or more control signals, electronic information indicative of one or more quantum bases, time-dependent qbit encoding schedules, or any combination thereof. In some embodiments, the qbit encoder 114 may include programmable firmware for receiving control signals and electronic instructions. In some embodiments, the qbit encoder 114 may be configured to encode, based on a first set of quantum bases (that are stored locally by the qbit encoder 114 or received from the encoding initiation device 112), a first set of bits received from the encoding initiation device 112 to generate a set of qbits. The qbit encoder 114 may be further configured to transmit the set of qbits to the qbit decoder 118 over a quantum line 118. In some embodiments, the qbit encoder 114 may be configured to transmit electronic information indicative of the first set of quantum bases to qbit decoder 116, the session authentication system 102, or both. In some embodiments, the qbit encoder 114 may be configured to not transmit any electronic information indicative of the first set of quantum bases. In some embodiments, the first set of quantum bases is not transmitted by the qbit encoder 114.

The qbit decoder 116 may be embodied by any suitable qbit decoder, such as an optoelectronic device (e.g., a PLD). In some embodiments, the qbit decoder 116 may include or store various data and electronic information. For example, the qbit decoder 116 may include or store one or more control signals, electronic information indicative of one or more quantum bases, time-dependent qbit decoding schedules, or any combination thereof. Alternatively, the session authentication system 102 may store this information (e.g., in one or more database 106). The qbit decoder 116 is communicatively coupled to the qbit encoder 114 by the quantum line 118 and is configured to receive a set of qbits from the qbit encoder 114 over the quantum line 118. The qbit decoder 116 may be further configured to decode the received set of qbits based on a second set of quantum bases different from the first set of quantum bases used to encode the set of qbits to generate a second set of bits. The second set of bits will thus include a random component insofar as at least one qbit has been encoded with a first quantum basis and was then decoded using a second quantum basis different from the first quantum basis. When this divergence of quantum bases occurs for multiple qbits, the second set of bits may comprise a plurality of error bits due to the effect of quantum uncertainty introduced into the system by the premeditated use of divergent quantum bases for encoding and decoding of the set of qbits. In some embodiments, the first set of quantum bases is not received by the qbit decoder 116.

The qbit encoder 114 and the qbit decoder 116 may be configured to respectively encode and decode various qbits of the set of qbits based on multiple quantum bases, such as a first quantum basis, a second quantum basis different from the first quantum basis, and in some embodiments, additional quantum bases different from the first or the second quantum bases. The difference in quantum basis used for encoding and decoding of a particular qbit may thus manifest in several arrangements. For instance, a first quantum basis used for encoding of a qbit may comprise a first pair of orthogonal photonic polarization states selected at least partially from the group consisting of a pair of rectilinear photonic polarization states, a pair of diagonal photonic polarization states, and a pair of circular photonic polarization states; and a second quantum basis used for decoding of the qbit may comprise a second pair of orthogonal photonic polarization states selected from the group but that are different from the first pair of orthogonal photonic polarization states.

In some embodiments, the qbit encoder 114 and the qbit decoder 116 may be configured to respectively encode and decode various qbits of the set of qbits based on multiple quantum basis, such as a first quantum basis, a second quantum basis different from the first quantum basis, and also a third quantum basis different from the first or the second quantum bases. In some instances, the third quantum basis may be the same as, or different from, the first quantum basis. For example, the first quantum basis may comprise a first pair of orthogonal photonic polarization states selected at least partially from the group consisting of a pair of rectilinear photonic polarization states, a pair of diagonal photonic polarization states, and a pair of circular photonic polarization states; the second quantum basis may comprise a second pair of orthogonal photonic polarization states different from the first pair of orthogonal photonic polarization states and selected from the same group; and the third quantum basis may comprise a third pair of orthogonal photonic polarization states different from the second pair of orthogonal photonic polarization states and selected from the same group. In one illustrative example, the first quantum basis may be the rectilinear basis, the second quantum basis may be the diagonal basis, and the third quantum basis may be the rectilinear basis or the circular basis. In another illustrative example, the first quantum basis may be the rectilinear basis, the second quantum basis may be the circular basis, and the third quantum basis may be the rectilinear basis or the diagonal basis. In yet another illustrative example, the first quantum basis may be the diagonal basis, the second quantum basis may be the rectilinear basis, and the third quantum basis may be the diagonal basis or the circular basis. In yet another illustrative example, the first quantum basis may be the diagonal basis, the second quantum basis may be the circular basis, and the third quantum basis may be the rectilinear basis or the diagonal basis. In yet another illustrative example, the first quantum basis may be the circular basis, the second quantum basis may be the rectilinear basis, and the third quantum basis may be the diagonal basis or the circular basis. In yet another illustrative example, the first quantum basis may be the circular basis, the second quantum basis may be the diagonal basis, and the third quantum basis may be the rectilinear basis or the circular basis.

In some embodiments, the qbit decoder 116 may be configured to decode the set of qbits based on the second quantum basis, a third quantum basis different from the second quantum basis, and a fourth quantum basis different from the second quantum basis and also different from the third quantum basis. In some instances, the fourth quantum basis may be the same as, or different from, the first quantum basis. For example, the first quantum basis may comprise a pair of orthogonal photonic polarization states selected at least partially from the group consisting of a pair of rectilinear photonic polarization states, a pair of diagonal photonic polarization states, and a pair of circular photonic polarization states; the second quantum basis may comprise the pair of rectilinear photonic polarization states; the third quantum basis may comprise the pair of diagonal photonic polarization states; and the fourth quantum basis may comprise the pair of circular photonic polarization states. In one illustrative example, the first quantum basis may be the rectilinear basis, the second quantum basis may be the rectilinear basis, the third quantum basis may be the diagonal basis, and the fourth quantum basis may be the rectilinear basis or the circular basis. In another illustrative example, the first quantum basis may be the diagonal basis, the second quantum basis may be the rectilinear basis, the third quantum basis may be the diagonal basis, and the fourth quantum basis may be the rectilinear basis or the circular basis. In yet another illustrative example, the first quantum basis may be the circular basis, the second quantum basis may be the rectilinear basis, the third quantum basis may be the diagonal basis, and the fourth quantum basis may be the rectilinear basis or the circular basis.

The qbit decoder 116 is configured to transmit, to the session authentication system 102, the second set of bits generated by decoding the received set of qbits. This transmission may occur either via one or more communications networks 108 or via a non-network communication path (although in embodiments where the qbit decoder 116 comprises a component of the session authentication system 102, internal conveyance of the second set of bits may occur via an internal system bus (not shown in FIG. 1), or may not need to occur at all). The session authentication system 102 is configured to then generate a number based on the second set of bits (e.g., using all of the bits in the second set of bits without discarding any of the bits in the second set of bits). In some embodiments, the second set of bits may comprise an entirety of the generated number. But in other embodiments, the second set of bits may comprise a plurality of error bits, and the generated number may comprise a binary number comprising the plurality of error bits but not all of the other bits in the second set of bits (i.e., the error bits are not discarded but one or more "correctly" decoded bits are discarded). In some embodiments, either (i) the first quantum basis is not transmitted by the qbit encoder or (ii) the second quantum basis is not transmitted by the qbit decoder. In some embodiments, the generated number cannot be reproduced without the first quantum basis, the first set of bits, and the second quantum basis. But even with all of this information, the generated number cannot reliably be recreated due to the randomization introduced by the quantum effect triggered from use of divergent sets of quantum bases during encoding and decoding of the set of qbits. In some embodiments, the qbit decoder 116 may be configured to transmit electronic information indicative of the second set of quantum bases to the qbit encoder 114, the session authentication system 102, or both. In some embodiments, the qbit decoder 116 may be configured to not transmit any electronic information indicative of any of the second set of quantum bases to any other device.

The session authentication system 102 may be configured to generate a session key based on the generated number. In some embodiments, the session authentication system 102 may be configured to generate a seed for pseudo-random number generation based on the generated number, and generate a pseudo-random number based on the seed, wherein generation of the session key is based on the pseudo-random number. In some instances, the generated number is the session key. The session authentication system 102 may use the generated session key to authenticate a session between a client device 110 and another device.

As a foundation for some embodiments, the qbit encoder 114 may provide for determining, selecting, choosing, or identifying the first quantum basis for encoding bits. In one illustrative embodiment, the qbit decoder 116 may transmit electronic information indicative of the second quantum basis or set of quantum bases to the qbit encoder 114, and the qbit encoder 114 may receive the electronic information from the qbit decoder 116 and determine the first quantum basis or set of quantum bases (e.g., a quantum basis different than the second quantum basis; a quantum basis different than at least one of the second quantum bases if more than one quantum bases are used for decoding qbits; or a set of quantum bases that includes at least one quantum basis that is not used for decoding qbits) based on the received electronic information. In another illustrative embodiment, the qbit decoder 116 may transmit electronic information indicative of the second quantum basis or set of quantum bases to the session authentication system 102, the session authentication system 102 may receive the electronic information from the qbit decoder 116 and transmit the received electronic information to the qbit encoder 114, and the qbit encoder 114 may receive the electronic information from the session authentication system 102 and determine the first quantum basis or set of quantum bases based on the received electronic information. For example, the qbit decoder 116 may transmit electronic information indicative that it is decoding qbits based on one quantum basis (e.g., the rectilinear basis; the diagonal basis; or the circular basis). The qbit encoder 114 may receive (e.g., directly from the qbit decoder 116 or indirectly via the session authentication system 102) that electronic information and determine to encode bits based on a quantum basis different than the quantum basis used by the qbit decoder 116 for decoding qbits. In another example, the qbit decoder 116 may transmit electronic information indicative that it is decoding qbits based on two quantum bases (e.g., the rectilinear and diagonal bases; the rectilinear and circular bases; or the diagonal and circular bases). The qbit encoder 114 may receive that electronic information and determine to encode bits based on only one of those two quantum bases used by the qbit decoder 116 for decoding qbits or based on another quantum basis different than those two quantum bases. In yet another example, the qbit decoder 116 may transmit electronic information indicative that it is decoding qbits based on three quantum bases (e.g., the rectilinear, diagonal, and circular bases), and the qbit encoder 114 may receive that electronic information and determine to encode bits based on one or two of those three quantum bases used by the qbit decoder 116 for decoding qbits.

As a foundation for some embodiments, the encoding initiation device 112 may provide for generating a first control signal indicative of an instruction to encode bits based on a first quantum basis or set of quantum bases that has been selected, chosen, determined, or identified by the encoding initiation device 112. In one illustrative embodiment, the qbit decoder 116 may transmit electronic information indicative of the second quantum basis or bases to the session authentication system 102, and the session authentication system 102 may convey the electronic information received from the qbit decoder 116 to the encoding initiation device 112, which in turn may generate a first control signal indicative of an instruction to encode bits based on the first quantum basis or set of quantum bases (e.g., a quantum basis different than the second quantum basis; a quantum basis different than at least one of the second quantum bases if more than one quantum bases are used for decoding qbits; or a set of quantum bases that includes at least one quantum basis that is not used for decoding qbits), and transmit that first control signal to qbit encoder 114, which may encode bits based on the first quantum basis or bases indicated by the first control signal. For example, the qbit decoder 116 may transmit electronic information indicative that it is decoding qbits based on one quantum basis (e.g., the rectilinear basis; the diagonal basis; or the circular basis). The session authentication system 102 may receive that electronic information and transmit it to the encoding initiation device 112, which in turn may generate a first control signal indicative of an instruction to encode bits based on a quantum basis different than the quantum basis used by the qbit decoder 116 for decoding qbits, and transmit that first control signal to the qbit encoder 114, which may encode bits based on the first quantum basis indicated by the first control signal. In another example, the qbit decoder 116 may transmit electronic information indicative that it is decoding qbits based on two quantum bases (e.g., the rectilinear and diagonal bases; the rectilinear and circular bases; or the diagonal and circular bases). The session authentication system 102 may receive that electronic information and transmit it to the encoding initiation device 112, which in turn may generate a first control signal indicative of an instruction to encode bits based on one of those two quantum bases used by the qbit decoder 116 for decoding qbits or a quantum basis different than those two quantum bases, and transmit that first control signal to the qbit encoder 114, which may encode bits based on the first quantum basis indicated by the first control signal. In yet another example, the qbit decoder 116 may transmit electronic information indicative that it is decoding qbits based on three quantum bases (e.g., the rectilinear, diagonal, and circular bases). The session authentication system 102 may receive that electronic information and transmit it to the encoding initiation device 112, which may generate a first control signal indicative of an instruction to encode bits based on one or two of those three quantum bases used by the qbit decoder 116 for decoding qbits, and transmit that first control signal to the qbit encoder 114, which may encode bits based on the first quantum basis indicated by the first control signal.

As illustrated by the above embodiments and examples, the qbit encoder 114 may thus determine the first quantum basis based on knowledge of the second quantum basis. As further illustrated by the above examples, the encoding initiation device 112 may generate, based on knowledge of the second quantum basis, a first control signal indicative of an instruction to encode bits based on a first quantum basis and transmit the first quantum basis to the qbit encoder 114 such that the qbit encoder 114 itself has no knowledge of the second quantum basis. In one illustrative example, the qbit decoder 116 may decode qbits using only the rectilinear basis, and the qbit encoder 114 may encode bits using only: the diagonal basis; the circular basis; the rectilinear and diagonal bases; the rectilinear and circular bases; the diagonal and circular bases; or the rectilinear, diagonal and circular bases. In another illustrative example, the qbit decoder 116 may decode qbits using only the diagonal basis, and the qbit encoder 114 may encode bits using only: the rectilinear basis; the circular basis; the rectilinear and diagonal bases; the rectilinear and circular bases; the diagonal and circular bases; or the rectilinear, diagonal and circular bases. In yet another illustrative example, the qbit decoder 116 may decode qbits using only the circular basis, and the qbit encoder 114 may encode bits using only: the rectilinear basis; the diagonal basis; the rectilinear and diagonal bases; the rectilinear and circular bases; the diagonal and circular bases; or the rectilinear, diagonal and circular bases. In yet another illustrative example, the qbit decoder 116 may decode qbits using only the rectilinear and diagonal bases, and the qbit encoder 114 may encode bits using only: the rectilinear basis; the diagonal basis; the circular basis; the rectilinear and circular bases; the diagonal and circular bases; or the rectilinear, diagonal and circular bases. In yet another illustrative example, the qbit decoder 116 may decode qbits using only the rectilinear and circular bases, and the qbit encoder 114 may encode bits using only: the rectilinear basis; the diagonal basis; the circular basis; the rectilinear and diagonal bases; the diagonal and circular bases; or the rectilinear, diagonal and circular bases. In yet another illustrative example, the qbit decoder 116 may decode qbits using only the diagonal and circular bases, and the qbit encoder 114 may encode bits using only: the rectilinear basis; the diagonal basis; the circular basis; the rectilinear and diagonal bases; the rectilinear and circular bases; or the rectilinear, diagonal and circular bases. In yet another illustrative example, the qbit decoder 116 may decode qbits using only the rectilinear, diagonal, and circular bases, and the qbit encoder 114 may encode bits using only: the rectilinear basis; the diagonal basis; the circular basis; the rectilinear and diagonal bases; the rectilinear and circular bases; or the diagonal and circular bases.

As a foundation for some embodiments, the qbit decoder 116 may provide for determining, selecting, choosing, or identifying the second quantum basis for decoding qbits. In one illustrative embodiment, the qbit encoder 114 may transmit electronic information indicative of the first quantum basis or set of quantum bases to the qbit decoder 116, and the qbit decoder 116 may receive the electronic information from the qbit encoder 114 and determine the second quantum basis or set of quantum bases (e.g., a quantum basis different than the first quantum basis; a quantum basis different than at least one of the first quantum bases if more than one quantum bases are used for encoding bits; or a set of quantum bases that includes at least one quantum basis that is not used for encoding bits) based on the received electronic information. In another illustrative embodiment, the qbit encoder 114 may transmit electronic information indicative of the first quantum basis or bases to the encoding initiation device 112, which may transmit this information to the session authentication system 102 (in some embodiments, the qbit encoder 114 may transmit electronic information indicative of the first quantum basis or bases directly to the session authentication system 102). In turn, the session authentication system 102 may receive the electronic information and transmit the received electronic information to the qbit decoder 116, and the qbit decoder 116 may receive the electronic information from the session authentication system 102 and determine the second quantum basis or bases based on the received electronic information. For example, the qbit encoder 114 may transmit electronic information indicative that it is encoding bits based on one quantum basis (e.g., the rectilinear basis; the diagonal basis; or the circular basis). The qbit decoder 116 may receive (e.g., directly from the qbit encoder 114 or indirectly via the encoding initiation device 112 and/or the session authentication system 102) that electronic information and determine to decode qbits received from the qbit encoder 114 based on a quantum basis different than the quantum basis used by the qbit encoder 114 for encoding qbits. In another example, the qbit encoder 114 may transmit electronic information indicative that it is encoding bits based on two quantum bases (e.g., the rectilinear and diagonal bases; the rectilinear and circular bases; or the diagonal and circular bases). The qbit decoder 116 may receive that electronic information and determine to decode qbits received from the qbit encoder 114 based on one of those two quantum bases used by the qbit encoder 114 for encoding bits or another quantum basis different than those two quantum bases. In yet another example, the qbit encoder 114 may transmit electronic information indicative that it is encoding bits based on three quantum bases (e.g., the rectilinear, diagonal, and circular bases), and the qbit decoder 116 may receive that electronic information and determine to decode qbits received from the qbit encoder 114 based on one or two of those three quantum bases used by the qbit encoder 114 for encoding bits.

As a foundation for some embodiments, the session authentication system 102 may provide for generating a second control signal indicative of an instruction to decode qbits based on a second quantum basis that has been selected, chosen, determined, or identified by the session authentication system 102. In one illustrative embodiment, the qbit encoder 114 may transmit electronic information indicative of the first quantum basis or bases to the session authentication system 102 (either directly or via the encoding initiation device 112), and the session authentication system 102 may receive the electronic information, generate a second control signal indicative of an instruction to decode qbits based on the second quantum basis or set of quantum bases (e.g., a quantum basis different than the first quantum basis; a quantum basis different than at least one of the first quantum bases if more than one quantum bases are used for encoding bits; or a set of quantum bases that includes at least one quantum basis that is not used for encoding bits), and transmit the generated second control signal to qbit decoder 116, which may decode qbits based on the second quantum basis or bases indicated by the second control signal. For example, the qbit encoder 114 may transmit electronic information indicative that it is encoding bits based on one quantum basis (e.g., the rectilinear basis; the diagonal basis; or the circular basis). The session authentication system 102 may receive that electronic information, generate a second control signal indicative of an instruction to decode qbits based on a quantum basis different than the quantum basis used by the qbit encoder 114 for encoding bits, and transmit that second control signal to the qbit decoder 116, which may decode qbits received from the qbit encoder 114 based on the second quantum basis indicated by the second control signal. In another example, the qbit encoder 114 may transmit electronic information indicative that it is encoding bits based on two quantum bases (e.g., the rectilinear and diagonal bases; the rectilinear and circular bases; or the diagonal and circular bases). The session authentication system 102 may receive that electronic information, generate a second control signal indicative of an instruction to decode qbits based on one of those two quantum bases used by the qbit encoder 114 for encoding bits, or a quantum basis different than those two quantum bases, and transmit that second control signal to the qbit decoder 116, which may decode qbits received from the qbit encoder 114 based on the second quantum basis indicated by the second control signal. In yet another example, the qbit encoder 114 may transmit electronic information indicative that it is encoding bits based on three quantum bases (e.g., the rectilinear, diagonal, and circular bases). The session authentication system 102 may receive that electronic information, generate a second control signal indicative of an instruction to decode qbits based on one or two of those three quantum bases used by the qbit encoder 114 for encoding bits, and transmit that second control signal to the qbit decoder 116, which may decode qbits received from the qbit encoder 114 based on the second quantum basis indicated by the second control signal.

Accordingly, as illustrated by the above embodiments and examples, the qbit decoder 116 may determine the second quantum basis based on knowledge of the first quantum basis. As further illustrated by the above embodiments and examples, the session authentication system 102 may alternatively generate, based on knowledge of the first quantum basis, a second control signal indicative of an instruction to decode qbits based on a second quantum basis and transmit the second control signal to the qbit decoder 116 such that the qbit decoder 116 has no knowledge of the first quantum basis. In one illustrative example, the qbit encoder 114 may encode bits using only the rectilinear basis, and the qbit decoder 116 may decode qbits using only: the diagonal basis; the circular basis; the rectilinear and diagonal bases; the rectilinear and circular bases; the diagonal and circular bases; or the rectilinear, diagonal and circular bases. In another illustrative example, the qbit encoder 114 may encode bits using only the diagonal basis, and the qbit decoder 116 may decode qbits using only: the rectilinear basis; the circular basis; the rectilinear and diagonal bases; the rectilinear and circular bases; the diagonal and circular bases; or the rectilinear, diagonal and circular bases. In yet another illustrative example, the qbit encoder 114 may encode bits using only the circular basis, and the qbit decoder 116 may decode qbits using only: the rectilinear basis; the diagonal basis; the rectilinear and diagonal bases; the rectilinear and circular bases; the diagonal and circular bases; or the rectilinear, diagonal and circular bases. In yet another illustrative example, the qbit encoder 114 may encode bits using only the rectilinear and diagonal bases, and the qbit decoder 116 may decode qbits using only: the rectilinear basis; the diagonal basis; the circular basis; the rectilinear and circular bases; the diagonal and circular bases; or the rectilinear, diagonal and circular bases. In yet another illustrative example, the qbit encoder 114 may encode bits using only the rectilinear and circular bases, and the qbit decoder 116 may decode qbits using only: the rectilinear basis; the diagonal basis; the circular basis; the rectilinear and diagonal bases; the diagonal and circular bases; or the rectilinear, diagonal and circular bases. In yet another illustrative example, the qbit encoder 114 may encode bits using only the diagonal and circular bases, and the qbit encoder 114 may decode qbits using only: the rectilinear basis; the diagonal basis; the circular basis; the rectilinear and diagonal bases; the rectilinear and circular bases; or the rectilinear, diagonal and circular bases. In yet another illustrative example, the qbit encoder 114 may encode bits using only the rectilinear, diagonal, and circular bases, and the qbit decoder 116 may decode qbits using only: the rectilinear basis; the diagonal basis; the circular basis; the rectilinear and diagonal bases; the rectilinear and circular bases; or the diagonal and circular bases.

In some embodiments, the qbit encoder 114 may be configured to encode bits based on a time-dependent qbit encoding schedule comprising a first plurality of quantum bases respectively corresponding to a first plurality of time periods. For example, the time-dependent qbit encoding schedule may comprise electronic information indicative of instructions to encode bits based on a rectilinear basis during a first time period (e.g., a first 10 nanoseconds), a diagonal basis during a second time period (e.g., the next 20 nanoseconds), a rectilinear basis during a third time period (e.g., the next 50 nanoseconds), and a circular basis during a fourth time period (e.g., the next 20 nanoseconds), after which the time-dependent qbit encoding schedule may repeat.

In some embodiments, the qbit decoder 116 may be configured to decode qbits based on a time-dependent qbit decoding schedule comprising a second plurality of quantum bases respectively corresponding to a second plurality of time periods. For example, the time-dependent qbit decoding schedule may comprise electronic information indicative of instructions to decode qbits based on a diagonal basis during a first time period (e.g., a first 5 nanoseconds), a rectilinear basis during a second time period (e.g., the next 30 nanoseconds), and a circular basis during a third time period (e.g., the next 10 nanoseconds), after which the time-dependent qbit decoding schedule may repeat.

It will be appreciated that other patterns of quantum basis selection may be utilized as well. For instance, the qbit encoder 114 and/or the qbit decoder 116 may be configured to respectively encode or decode qbits based on a corresponding unit-dependent encoding or decoding schedule. For example, a unit-dependent qbit encoding schedule may comprise electronic information indicative of instructions to encode qbits based on a rectilinear basis for a first number of bits (e.g., a first 2 bits), a diagonal basis for a second number of bits (e.g., the next 5 bits), a rectilinear basis for a third number of bits (e.g., the next 3 bits), and a circular basis during for a fourth number of bits (e.g., the next 2 bits), after which the unit-dependent qbit encoding schedule may repeat. As another example, a unit-dependent qbit decoding schedule may comprise electronic information indicative of instructions to decode qbits based on a diagonal basis for a first number of bits (e.g., a first 2 bits), a rectilinear basis for a second number of bits (e.g., the next 4 bits), and a circular basis during for a third number of bits (e.g., the next 2 bits), after which the unit-dependent qbit decoding schedule may repeat. Other encoding and decoding patterns may be utilized as well without departing from the scope of the present disclosure.

It will further be appreciated that the selection of the quantum basis or set of quantum bases used by one of the qbit encoder 114 or the qbit decoder 116 may also be selected without knowledge of the corresponding quantum basis or set of quantum bases used by the other of the qbit encoder 114 or the qbit decoder 116. For instance, the encoding initiation device 112 may select a set of quantum bases for use by the qbit encoder 114 using a pseudo-random selection method, and both the encoding initiation device 112 and the qbit encoder 114 may never thereafter transmit information about the selected set of quantum bases. Similarly, the session authentication system 102 may select a set of quantum bases for use by the qbit decoder 116 using a pseudo-random selection method, and both the session authentication system 102 and the qbit decoder 116 may never thereafter transmit information about the selected set of quantum bases.

By way of example, in some embodiments, the selection of an appropriate set of quantum bases may utilize a frequency calculation procedure in which a selection frequency for each quantum basis may be monitored such that the likelihood that an unselected quantum basis is selected during subsequent selections is increased until an unselected quantum basis is selected. Said differently, in an instance in which a first quantum basis is initially selected, the remaining quantum bases may be weighted such that selection of these quantum bases on subsequent selections operations is more likely as compared to the first quantum basis. Once these remaining quantum bases are selected in the future, however, their corresponding weighting may decrease relative to still other unselected quantum bases. To duplicate this pseudo-random process, an intruder would need to have insight into multiple different iterations of the pseudo-random number generation process, and even then would need to deduce the weighting scheme. While a frequency calculation procedure is outlined above for selection of a set of quantum bases for the qbit encoder 114 or the qbit decoder 116, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the set of quantum bases for the qbit encoder 114 and/or the qbit decoder 116 without departing from the scope of the disclosure.

Example Implementing Apparatus

The example environment 100 described with reference to FIG. 1 may be embodied by one or more computing systems, such as apparatus 200 shown in FIG. 2A, which represents an example session authentication system 102, apparatus 220 shown in FIG. 2B, which represents an example client device 110, apparatus 240 shown in FIG. 2C, which represents an example encoding initiation device 112, apparatus 260 shown in FIG. 2D, which represents an example qbit encoder 114, and apparatus 280 shown in FIG. 2E, which represents an example qbit decoder 116. As noted previously, it will be appreciated that in some embodiments, one or more of the apparatuses described in connection with FIGS. 2A-2E may be components of another of these apparatuses (as one example, the apparatus 240, representing a encoding initiation device 112, may in some embodiments be a component of apparatus 200, which represents an example of the session authentication system 102; as another example, apparatus 260, which represents a qbit encoder 114, may in some embodiments be a component of apparatus 240, which represents the encoding initiation device 112; and as yet another example, apparatus 280, which represents a qbit decoder 116, may in some embodiments be a component of apparatus 200, which, as noted above, represents an example session authentication system 102).

Figure 2A:
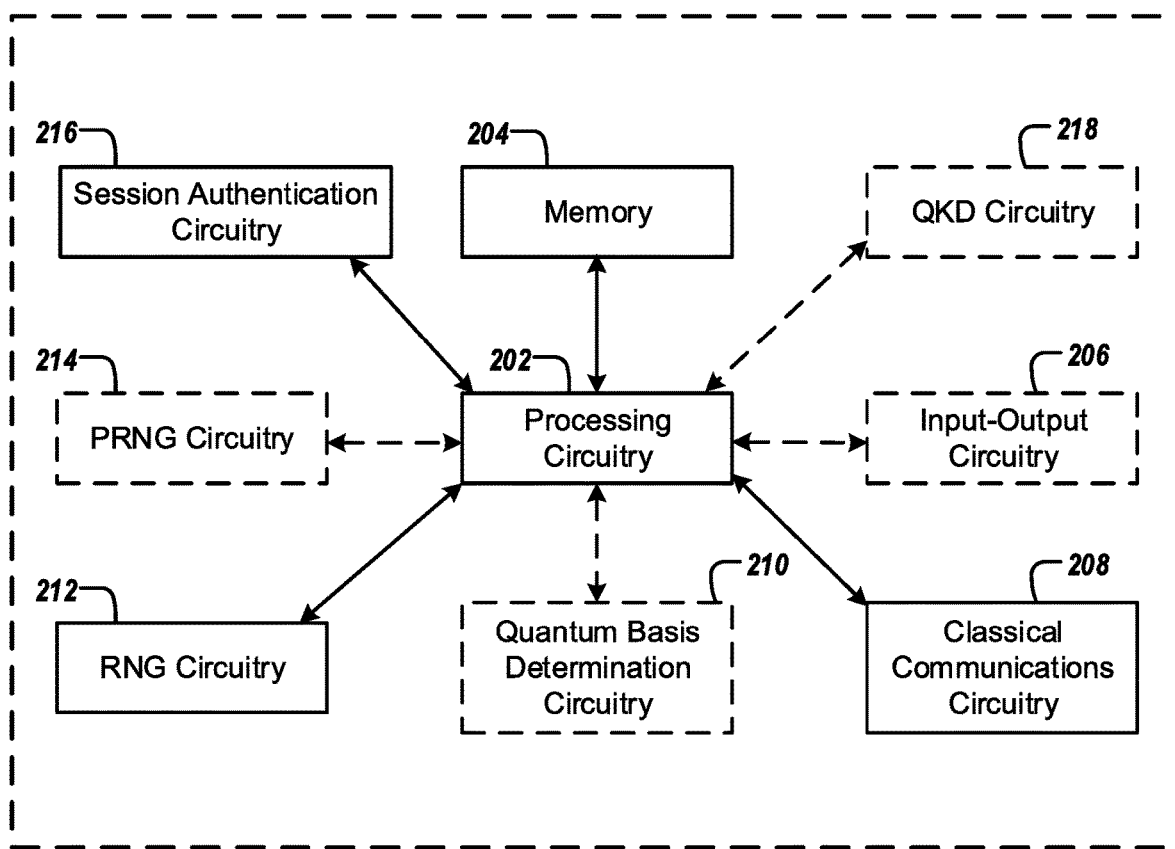
FIGS. 2A, 2B, 2C, 2D, and 2E illustrate schematic block diagrams of example circuitry that may perform various operations in accordance with some example embodiments described herein.

As illustrated in FIG. 2A, the apparatus 200, representing an example session authentication system 102 or a session authentication system server device 104 resident within a session authentication system 102, may include processing circuitry 202, memory 204, input-output circuitry 206, classical communications circuitry 208, quantum basis determination circuitry 210, random number generation (RNG) circuitry 212, pseudo-random number generation (PRNG) circuitry 214, session authentication circuitry 216, and quantum key distribution (QKD) circuitry 218. The apparatus 200 may be configured to execute various operations described above with respect to FIG. 1 and below with respect to FIGS. 3-4.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data, control signals, electronic information, and, in some instances, encoding and decoding schedules. It will be understood that the memory 204 may be configured to store any electronic information, data, control signals, schedules, embodiments, examples, figures, techniques, processes, operations, techniques, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a set of bits, a control signal (e.g., a control signal indicative of an instruction to encode bits or decode qbits according to a particular quantum basis or set of quantum bases), or a schedule (e.g., a time-dependent qbit encoding schedule, time-dependent qbit decoding schedule, a unit-dependent qbit encoding schedule, or a unit-dependent qbit decoding schedule) provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic content for display by one or more other devices with which one or more users directly interact and classical communications circuitry 208 of the apparatus 200 may be leveraged to transmit the generated electronic content to one or more of those devices.

The classical communications circuitry 208 may be any device or circuitry embodied in either hardware or a combination of hardware and software that is configured to receive and/or transmit data from or to a network and/or any other device, circuitry, or module in communication with the apparatus 200. In this regard, the classical communications circuitry 208 may include, for example, a network interface for enabling communications with a wired or wireless communications network. For example, the classical communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, Near Field Communications (NFC), Worldwide Interoperability for Microwave Access (WiMAX) or other proximity-based communications protocols.

The quantum basis determination circuitry 210 includes hardware components designed or configured to determine, select, choose, or identify: a first quantum basis or set of quantum bases for encoding bits; a second quantum basis or set of quantum bases for decoding qbits; or both. In some embodiments, the quantum basis determination circuitry 210 includes hardware components designed or configured to generate: a first control signal indicative of an instruction to encode bits based on a first quantum basis or set of quantum bases; a second control signal indicative of an instruction to decode qbits based on a second quantum basis or set of quantum bases; or both. In some embodiments, the quantum basis determination circuitry 210 includes hardware components designed or configured to generate: a time-dependent qbit encoding schedule comprising a first plurality of quantum bases respectively corresponding to a first plurality of time periods; a time-dependent qbit decoding schedule comprising a second plurality of quantum bases respectively corresponding to a second plurality of time periods; or both. In some embodiments, the quantum basis determination circuitry 210 includes hardware components designed or configured to generate: a unit-dependent qbit encoding schedule comprising a first plurality of quantum bases respectively corresponding to a first plurality of numbers of bits; a unit-dependent qbit decoding schedule comprising a second plurality of quantum bases respectively corresponding to a second plurality of numbers of bits; or both. The set of quantum bases may be selected by the quantum basis determination circuitry 210 using a pseudo-random selection method, as described previously. Subsequently, the quantum basis determination circuitry 210 may never thereafter transmit information about the selected set of quantum bases, except as necessary for instruction of corresponding qbit encoder 114 or qbit decoder 116. The hardware components comprising the quantum basis determination circuitry 210 may, for instance, utilize processing circuitry 202 to perform various computing operations and may utilize memory 204 for storage of data or electronic information received or generated by the quantum basis determination circuitry 210. The hardware components may further utilize classical communications circuitry 208 or any other suitable wired or wireless communications path to communicate with an encoding initiation device 112, a qbit encoder 114, a qbit decoder 116, or any other suitable circuitry or device described herein.

The RNG circuitry 212 includes hardware components designed or configured to generate a number based on a second set of bits generated by a qbit decoder 116. For example, the generated number may be an actual second set of bits generated by the qbit decoder 116, a number that includes the second set of bits in its entirety, a number that includes only "error" bits for which a quantum basis used for encoding of a qbit differs from a quantum basis used for decoding of the qbit, or any other suitable number. These hardware components may, for instance, utilize processing circuitry 202 to perform various computing operations and may utilize memory 204 for storage of data or electronic information received or generated by the RNG circuitry 212. The hardware components may further utilize classical communications circuitry 208, or any other suitable wired or wireless communications path to communicate with a qbit decoder 116 or any other suitable circuitry or device described herein.

The PRNG circuitry 214 includes hardware components designed or configured to receive a seed for pseudo-random number generation based on the number generated by the RNG circuitry 212 and then generate a pseudo-random number based on the seed. These hardware components may, for instance, utilize processing circuitry 202 to perform various computing operations and may utilize memory 204 for storage of data or electronic information received or generated by the PRNG circuitry 214.

The session authentication circuitry 216 includes hardware components designed or configured to generate a session ID (e.g., a session key) based on a number generated by the RNG circuitry 212, a pseudo-random number generated by the PRNG circuitry 214, or both. For example, the session authentication circuitry 216 may receive the pseudo-random number from the PRNG circuitry 214 and use the received pseudo-random number as the session key. In another example, the session authentication circuitry 216 may receive the generated number from the RNG circuitry 212 and use the generated number as the session key. In yet another example, the session authentication circuitry 216 may perform a further transformation on a number generated by the RNG circuitry 212 or a pseudo-random number generated by the PRNG circuitry 214 (e.g., a convolution of the number or pseudo-random number with an independent variable, such as an internal clock time measured by the apparatus 200), and thereafter use the result of the further transformation as the session key. Following generation of the session key, the session authentication circuitry 216 may transmit the session key to a client device 110 (and in one such embodiment, the session authentication circuitry 216 may cause QKD circuitry 218 to perform quantum key distribution of the session key to securely transmit the session key). In some embodiments, the session authentication circuitry 216 includes hardware components designed or configured to subsequently authenticate a session between two or more devices. For example, the session authentication circuitry 216 may use the generated session key to authenticate a session on behalf of a server device (e.g., an authentication system server device 104) and at the request of a client device 110. The session authentication circuitry 216 may receive a key from the client device 110, and then compare the received key to the generated session key to determine if a match is found. If so, the session authentication circuitry 216 may transmit a communication to the server device comprising a validation of the session key received from the client device 110. If not, then the session authentication circuitry 216 may transmit a communication to the server device indicating a validation failure. The hardware components comprising the session authentication circuitry 216 may, for instance, utilize processing circuitry 202 to perform various computing operations and may utilize memory 204 for storage of data or electronic information received or generated by the session authentication circuitry 216. The hardware components may further utilize classical communications circuitry 208, or any other suitable wired or wireless communications path to communicate with a remote server device or a client device 110, or any other suitable circuitry or device described herein.

The QKD circuitry 218 includes hardware components designed or configured to perform quantum key distribution of a session key generated by the session authentication circuitry 216. These hardware components may, for instance, utilize processing circuitry 202 to perform various computing operations and may utilize memory 204 for storage of data or electronic information received or generated by the QKD circuitry 218. The hardware components may further utilize classical communications circuitry 208, or any other suitable wired or wireless communications path to communicate with a client device 110 to distribute a session ID to the client device 110, or with any other suitable circuitry or device described herein.

Figure 2B:
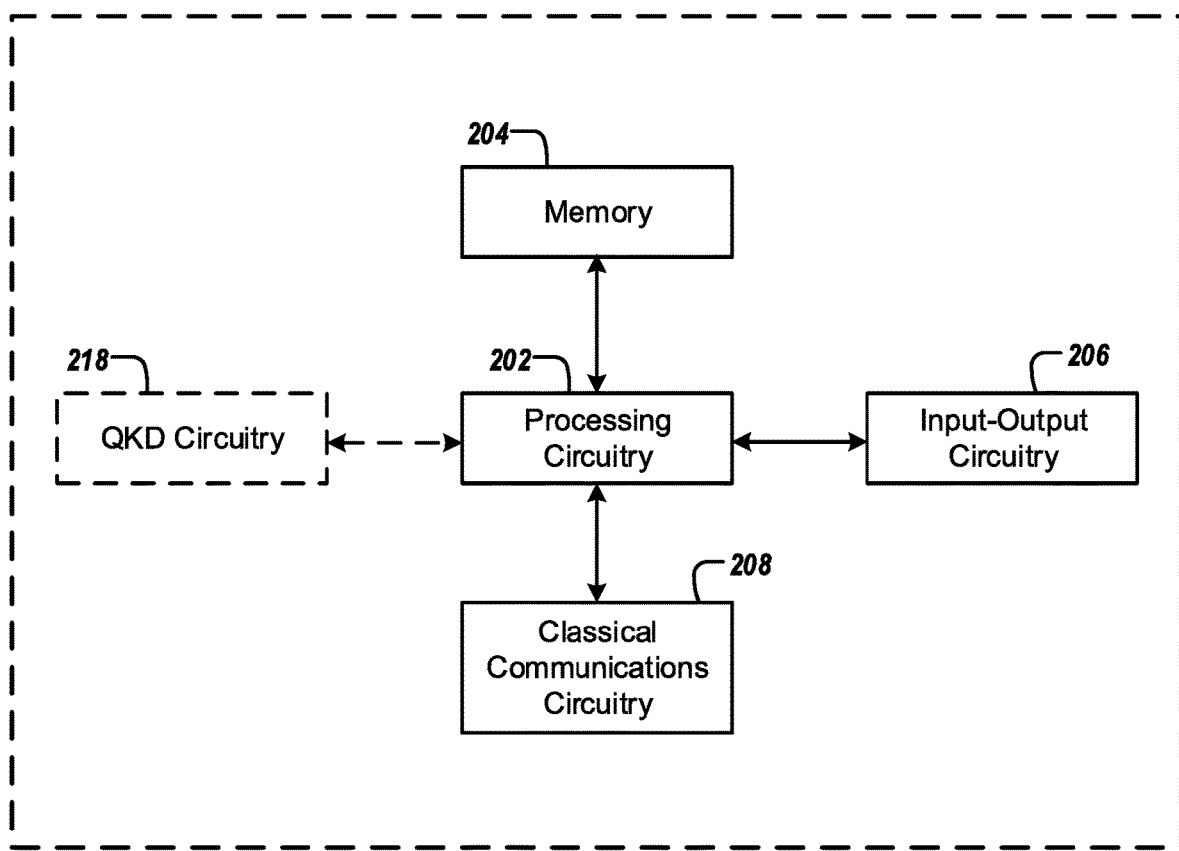

As illustrated in FIG. 2B, an apparatus 220 is shown that represents an example client device 110. The apparatus 220 includes processing circuitry 202, memory 204, input-output circuitry 206, and classical communications circuitry 208, and may optionally include QKD circuitry 218, as described above in connection with FIG. 2A. It will be appreciated that QKD circuitry 218 is an optional component of the apparatus 220 insofar as it is only required if a session ID (e.g., session key) is distributed from the session authentication system 102 to the client device 110 via a QKD procedure (other key distribution techniques may alternatively be used). It will be understood, however, that additional components providing additional functionality may be included in the apparatus 220 without departing from the scope of the present disclosure. The apparatus 220 may be involved in execution of various operations described above with respect to FIG. 1 and below with respect to FIGS. 3-4.

Figure 2C:
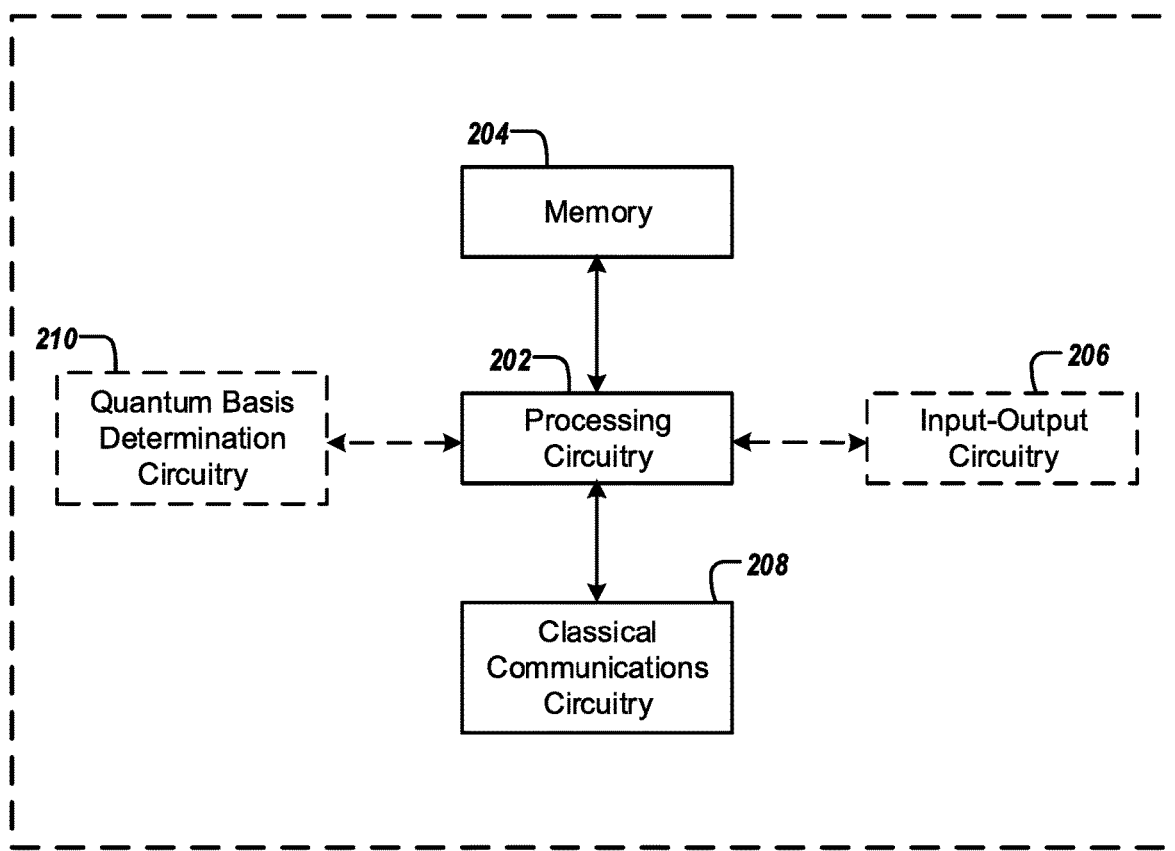

As illustrated in FIG. 2C, an apparatus 240 is shown that represents an example encoding initiation device 112. The apparatus 240 includes processing circuitry 202, memory 204, and classical communications circuitry 208, and may optionally include input-output circuitry 206, as described above in connection with FIG. 2A. Input-output circuitry 206 is optional in apparatus 240 insofar as it is only required in embodiments where a user directly interacts with the apparatus 240 to provide information needed for quantum basis determination for a qbit encoder 114 communicatively connected to the encoding initiation device 112. To this end, the apparatus 240 may also include quantum basis determination circuitry 210, as described above in connection with FIG. 2A, for the purpose of selecting an appropriate quantum basis for the qbit encoder 114.

The apparatus 240 may be configured to execute various operations described above with respect to FIG. 1 and below with respect to FIGS. 3-4. It will be understood, however, that additional components providing additional functionality may be included in the apparatus 240 without departing from the scope of the present disclosure. Moreover, as noted previously, in some embodiments the encoding initiation device 112 comprises a component of session authentication system 102, and in such embodiments, the components described herein in connection with apparatus 240 shall be understood as comprising components of an apparatus 200 representing a corresponding session authentication system 102 (or a constituent session authentication system server device 104 thereof).

Figure 2D:
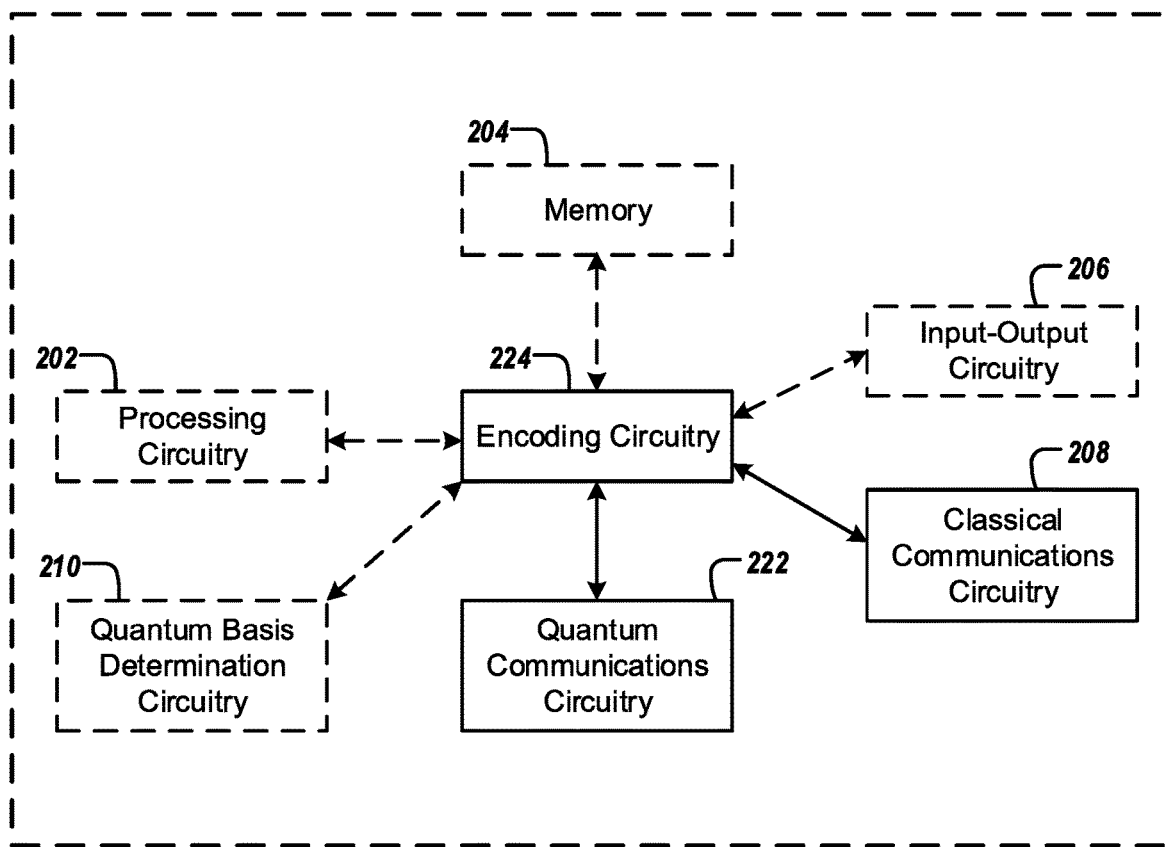

As illustrated in FIG. 2D, an apparatus 260 is shown that represents an example qbit encoder 114. The apparatus 260 includes classical communications circuitry 208, as described above in connection with FIG. 2A. The apparatus 260 additionally includes quantum communications circuitry 222 to transmit a set of qbits to a qbit decoder, and encoding circuitry 224 to generate the set of qbits to be transmitted. In addition, the apparatus 260 may further include processing circuitry 202 and a memory 204 to facilitate operation of encoding circuitry 224, and may include quantum basis determination circuitry 210 in some embodiments where the quantum basis, or set of quantum bases, selected for encoding of a given set of bits is determined by the apparatus 260 and not by a separate encoding initiation device 112 or session authentication system 102.

The quantum communications circuitry 222 may be any device or circuitry embodied in either hardware or a combination of hardware and software that is configured to receive and/or transmit qbits from or to any other device, circuitry, or module in communication with the apparatus 260. In this regard, the quantum communications circuitry 222 may include, for example, a quantum communications interface for enabling quantum communications over a quantum line (e.g., quantum line 118, in FIG. 1).

The encoding circuitry 224 includes hardware components designed or configured to generate a set of qbits by encoding a first set of bits based on a first set of quantum bases. The encoding circuitry 224 may comprise various optoelectronic components, such as those described previously. In some embodiments, the encoding circuitry 224 may include additional hardware components designed or configured to encode bits based on a time-dependent qbit encoding schedule comprising a first plurality of quantum bases respectively corresponding to a first plurality of time periods. Similarly, the encoding circuitry 224 may include additional hardware components designed or configured to encode bits based on a unit-dependent qbit encoding schedule comprising a first plurality of quantum bases respectively corresponding to a first plurality of numbers of bits to be encoded. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., an encoding initiation device 112 or session authentication system server device 104), or any other suitable circuitry or device described herein.

The apparatus 260 may be configured to execute various operations described above with respect to FIG. 1 and below with respect to FIGS. 3-4. It will be understood, however, that additional components providing additional functionality may be included in the apparatus 260 without departing from the scope of the present disclosure. Moreover, as noted previously, in some embodiments the qbit encoder 114 comprises a component of an encoding initiation device 112, and in such embodiments, the components described herein in connection with apparatus 260 shall be understood as comprising components of an apparatus 240 representing a corresponding encoding initiation device 112 (or, by extension, of a session authentication system 102 (or a constituent session authentication system server device 104 thereof) in embodiments in which the encoding initiation device 112 itself comprises a component of one of those devices).

Figure 2E:
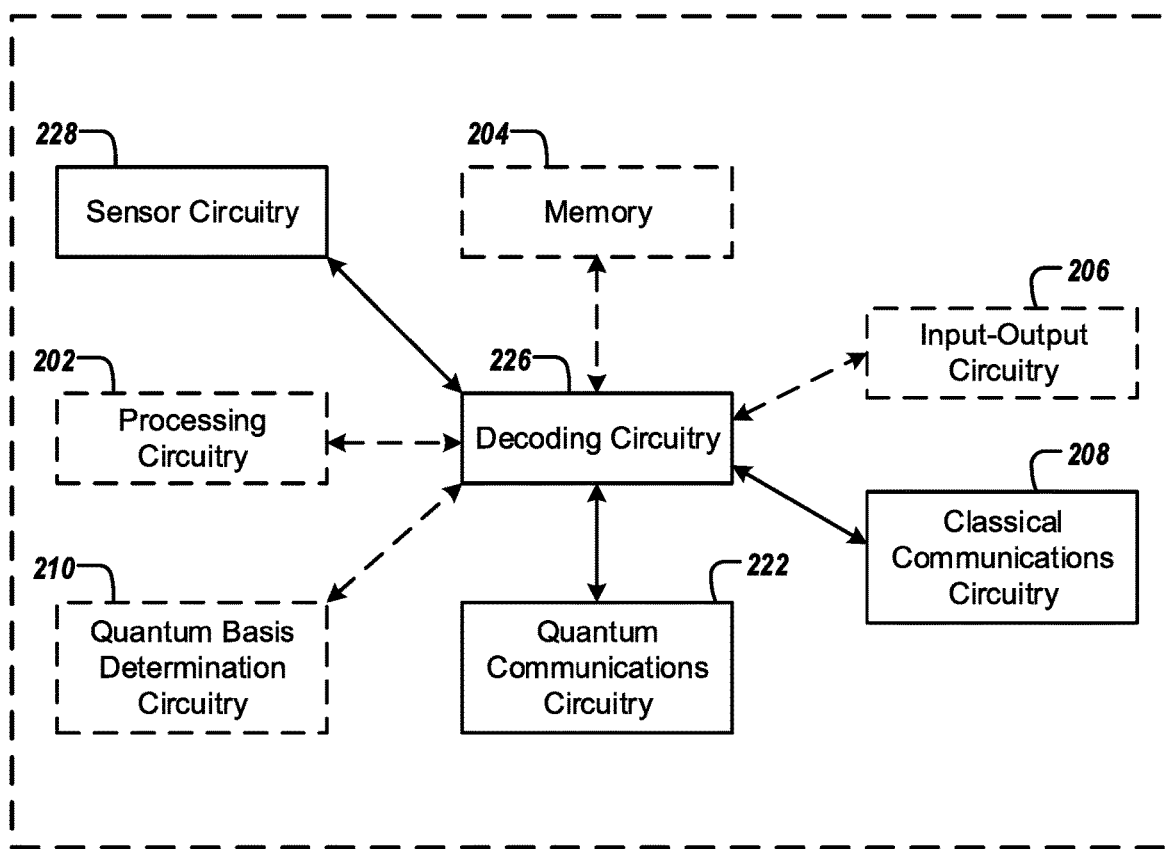

As illustrated in FIG. 2E, an apparatus 280 is shown that represents an example qbit decoder. The apparatus 280 includes classical communications circuitry 208 and quantum communications circuitry 222, as described above in connection with FIG. 2D, and additionally includes decoding circuitry 226 to decode a set of qbits received from a qbit encoder. Furthermore, in similar fashion as described above in connection with FIG. 2D, the apparatus 280 may further optionally include processing circuitry 202 and a memory 204 to facilitate operation of decoding circuitry 226, and may include quantum basis determination circuitry 210 in some embodiments where the quantum basis, or set of quantum bases, selected for decoding of a given set of bits is determined by the apparatus 280 and not by a separate session authentication system 102.

The decoding circuitry 226 includes hardware components designed or configured to generate a second set of bits by decoding the set of qbits received from a qbit encoder 114 based on a second set of quantum bases different from a first set of quantum bases used for encoding the set of qbits. The decoding circuitry 226 may comprise various optoelectronic components, such as those described previously. The second set of bits generated by the decoding circuitry 226 may be different from the first set of bits encoded by the qbit encoder 114. For example, the second set of bits may include one or more error bits that are not discarded. In some embodiments, when the encoding circuitry 224 of a qbit encoder 114 uses N quantum bases for encoding bits, the decoding circuitry 226 may use N−2, N−1, N+1, N+2, etc., quantum bases for decoding the qbits. In some embodiments, when the encoding circuitry 224 uses N quantum bases for encoding bits, the decoding circuitry 226 may also use N quantum bases for decoding the qbits, where the set of quantum bases used for encoding the bits is distinct from the set of quantum bases used for decoding the qbits. In some embodiments, when the encoding circuitry 224 uses N quantum bases for encoding bits, the decoding circuitry 226 may use the same N quantum bases for decoding the qbits, so long as the sequence by which the N quantum bases are selected for decoding qbits diverges from the sequence by which the N quantum bases are selected for encoding bits. For example, in some embodiments, the decoding circuitry 226 may include additional hardware components designed or configured to decode qbits based on a time-dependent qbit decoding schedule comprising a second plurality of quantum bases respectively corresponding to a second plurality of time periods. As another example, in some embodiments, the decoding circuitry 226 may include additional hardware components designed or configured to decode qbits based on a unit-dependent qbit decoding schedule comprising a second plurality of quantum bases respectively corresponding to a second plurality of numbers of bits to be decoded. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, quantum communications circuitry 222, or any suitable wired or wireless communications path to communicate with a server device (e.g., one or more session authentication system server devices 104) a qbit encoder 114, or any other suitable circuitry or device described herein. In some instances, the decoding circuitry 226 may decode the set of qbits by measuring the set of qbits using sensor circuitry 228.

The sensor circuitry 228 includes hardware components designed or configured to measure received qbits. For example, the sensor circuitry 228 may comprise one or more sensors such as photodetectors, photodiodes, cameras, or any other suitable devices or optoelectronic components. These hardware components may, for instance, utilize processing circuitry 202 to perform various computing operations and may utilize memory 204 for storage of data or electronic information received or generated by the sensor circuitry 228.

The apparatus 280 may be configured to execute various operations described above with respect to FIG. 1 and below with respect to FIGS. 3-4. It will be understood, however, that additional components providing additional functionality may be included in the apparatus 280 without departing from the scope of the present disclosure. Moreover, as noted previously, in some embodiments the qbit decoder 116 comprises a component of a session authentication system 102, and in such embodiments, the components described herein in connection with apparatus 280 shall be understood as comprising components of an apparatus 200 representing a corresponding session authentication system 102 (or a constituent session authentication system server device 104 thereof).

Although some of these components of apparatuses 200, 220, 240, 260, and 280 are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, quantum communications interface, optoelectronic components, storage medium, or the like to perform their associated functions, such that duplicate hardware is not required for each set of circuitry. It should also be appreciated that, in some embodiments, one or more of these components may include a separate processor, specially configured field programmable gate array (FPGA), application specific interface circuit (ASIC), or cloud utility to perform its corresponding functions as described herein.

The use of the term "circuitry" as used herein with respect to components of apparatuses 200, 220, 240, 260, and 280 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, quantum communications interfaces, input-output devices, optoelectronic components, and other components. In some embodiments, other elements of apparatuses 200, 220, 240, 260, and 280 may provide or supplement the functionality of particular circuitry. For example, the processing circuitry 202 may provide processing functionality, memory 204 may provide storage functionality, and classical communications circuitry 208 may provide network interface functionality, among other features.

In some embodiments, various components of one or more of the apparatuses 200, 220, 240, 260, or 280 may be hosted remotely (e.g., by one or more cloud servers) and thus need not physically reside on the corresponding apparatus 200, 220, 240, 260, or 280. Thus, some or all of the functionality described herein may be provided by third party circuitry. For example, a given apparatus 200, 220, 240, 260, or 280 may access one or more third party circuitries via any sort of networked connection that facilitates transmission of data and electronic information between the apparatus 200, 220, 240, 260, or 280 and the third party circuitries. In turn, that apparatus 200, 220, 240, 260, or 280 may be in remote communication with one or more of the other components describe above as comprising the apparatus 200, 220, 240, 260, or 280.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 illustrates an example table 300 comprising example sets of bits and quantum bases. As shown in FIG. 3, example table 300 includes a first optoelectronic device comprising one example of a qbit encoder 114 that encodes a first set of bits ("11000110") based on a first quantum basis ("First," "First," "First," "First," "First," "First," "First," "First") to generate a set of qbits (i.e., an eight qbit sequence). The first optoelectronic device transmits the generated set of qbits to a second optoelectronic device comprising one example of a qbit decoder 116. The second optoelectronic device receives the set of qbits and uses alternative first and second quantum bases ("First," "Second," "First," "Second," "First," "Second," "First," "Second") to measure and thus decode the set of qbits. When the second optoelectronic device uses the first quantum basis, the decoded bit is correct. When the second optoelectronic device uses the second basis, the decoded bit is referred to herein as a "wildcard bit" that has a first probability (e.g., a fifty percent chance) of being correct and a second probability (e.g., a fifty percent chance) of being incorrect, because each state in the first basis is a linear combination of the states in the second basis.

It will be understood, however, that the term "wildcard bit" refers not just to a decoded bit produced by this particular arrangement, but refers to any bit produced by decoding a qbit using a different quantum basis than was used to generate the qbit. Moreover, although a wildcard bit may in some embodiments have an even likelihood (e.g., fifty percent probability) of being decoded correctly or incorrectly, in other embodiments a given wildcard bit may have a probability of being decoded correctly that is different from its probability of being decoded incorrectly. To this end, the likelihood of accurate decoding is dependent on the nature of the particular quantum bases used for encoding and for decoding. More specifically, the probability that a given wildcard bit has been decoded correctly is a function of the degree of divergence of the quantum basis used for generating the qbit from the quantum basis used for decoding the qbit. For instance, when the first quantum basis comprises a first photonic polarization state and the second quantum basis comprises a second photonic polarization state different from the first photonic polarization state, the angle between the polarization states determines the probability that the wildcard bit is decoded correctly. As such, based on the angle between the polarization states, the probability that a wildcard bit is correctly decoded may vary widely (e.g., it may be 1%, 10%, 20%, 25%, 75%, 80%, 90%, 99%, etc.) and the probability that the wildcard bit is decoded incorrectly will have a correspondingly wide (but opposite) variation (e.g., it may be 99%, 90%, 80%, 75%, 25%, 20%, 10%, 1%, etc.).

Returning to the example illustrated in FIG. 3, the second optoelectronic device generates a second set of bits ("10000010") that includes four wildcard bits (i.e., the second bit "0"; the fourth bit "0"; the sixth bit "0"; and the eighth bit "0") and two error bits (i.e., the second bit "0" and the sixth bit "0"). It will be understood, however, that even if the first set of qbits were stored and decoded a second time, the 50% probability of decoding accuracy when using the "wrong" quantum basis will ensure that a new second set of bits may not be the same as the original second set of bits. For instance, the new second set of bits generated by the second optoelectronic device may correctly decode the second bit, but may measure the sixth bit in error. Accordingly, even if a perpetrator were to deduce the first set of bits ("11000110"), there is no way for that perpetrator to deduce the second set of bits ("10000010") from the first set of bits. Thus, the second set of bits ("10000010") may be used as a session ID or may be used as the seed for a pseudo-random number generator that generates a session ID. Although an 8 qbit example is illustrated in FIG. 3, in some embodiments, a larger number of bits may be utilized (e.g., 256 bits, 1048 bits). Regardless of the number of bits used, a chance of error will remain for each bit measured using the incorrect quantum basis.

In some embodiments which are not shown in FIG. 3 for the sake of brevity, the second optoelectronic device may receive the set of qbits and use alternative first, second, and third quantum bases ("First," "Second," "Third," "First," "Second," "Third," "First," "Second") to measure and thus decode the set of qbits. In this situation, the generated second set of bits includes a higher likelihood of error because even fewer of the qbits will be decoded using the same quantum basis with which they were encoded. Accordingly, the amount of randomness introduced into the decoded set of bits may be increased by increasing the mismatch between the quantum bases used for encoding and decoding of qbits.

Having described specific components of example devices and circuitries involved in various embodiments contemplated herein, example procedures for session authentication are described below in connection with FIG. 4.

Example Operations for Session Authentication

Turning to FIG. 4, an example flowchart 400 is illustrated that contains example operations for session authentication according to an example embodiment. The operations illustrated in FIG. 4 may, for example, be performed by one or more of the apparatuses shown in FIG. 1, and described in FIGS. 2A-2E, such as apparatus 200, which illustrates an example session authentication system 102, apparatus 220, which illustrates an example client device 110, apparatus 240, which illustrates an example encoding initiation device 112, apparatus 260, which illustrates an example qbit encoder 114, or apparatus 280, which illustrates an example qbit decoder 116. Although the following operations are described as being performed by one or another of apparatuses 200, 220, 240, 260, or 280, it will be understood that this manner of description is for ease of explanation and should not be interpreted as meaning that others of apparatuses 200, 220, 240, 260, or 280 cannot perform such operations (such as in embodiments in which, for instance, one or more of these apparatuses comprise components of another of these apparatuses). The various operations described in connection with FIG. 4 may be performed by one of apparatuses 200, 220, 240, 260, or 280, and by or through the use of one or more corresponding processing circuitry 202, memory 204, input-output circuitry 206, classical communications circuitry 208, quantum basis determination circuitry 210, RNG circuitry 212, PRNG circuitry 214, session authentication circuitry 216, QKD circuitry 218, quantum communications circuitry 222, encoding circuitry 224, decoding circuitry 226, sensor circuitry 228, any other suitable circuitry, or any combination thereof.

As shown by operation 402, an apparatus 260 includes means for generating a set of qbits by encoding a first set of bits based on a first set of quantum bases. The means for generating the set of qbits may be any suitable means, such as encoding circuitry 224 of a qbit encoder 114, as described with reference to FIG. 1 and FIG. 2D above. The qbit encoder may be any suitable optoelectronic device, such as those describe previously. As shown in FIG. 3, the first set of bits ("11000110") may be encoded based on a first quantum basis ("First," "First," "First," "First," "First," "First," "First," "First") to generate a set of qbits (i.e., an eight qbit sequence). It will be understood that although a qbit encoder 114 encodes a first set of bits based on the first set of quantum bases, other devices illustrated in the environment 100 of FIG. 1 may perform preliminary operations facilitating performance of operation 402. In this regard, either the qbit encoder 114 itself, the encoding initiation device 112, or a session authentication system 102 (in embodiments where the encoding initiation device 112 is a component thereof) may invoke quantum basis determination circuitry 210 to select the first set of quantum bases. As noted previously, the quantum basis determination circuitry 210 may utilize a pseudo-random process for identifying one or more quantum bases to utilize in the first set of quantum bases. Moreover, this pseudo-random process may identify not just a set of quantum bases to use, but may also identify one or another encoding schedule (e.g., a time-based encoding schedule or a unit-based encoding schedule, or another encoding schedule altogether) governing when to use each quantum basis in the set of quantum bases for encoding of the set of bits.

As shown by operation 404, the apparatus 260 comprising qbit encoder 114 includes means for transmitting the set of qbits over a quantum line to a qbit decoder 116. The means for transmitting the set of qbits may be any suitable means, such as quantum communications circuitry 222 described with reference to FIG. 2D above. The quantum line may be any suitable quantum line, such as quantum line 118 described with reference to FIG. 1. The qbit decoder 116 may be any suitable optoelectronic device, such as qbit decoder 116 described with reference to FIG. 1.

As shown by operation 406, the apparatus 280 comprising qbit decoder 116 includes means for receiving the set of qbits over the quantum line from the qbit encoder. The means for receiving the set of qbits may be any suitable means, such as quantum communications circuitry 222 described with reference to FIGS. 2D and 2E previously.

As shown by operation 408, the apparatus 280 includes means for generating a second set of bits by decoding the set of qbits based on a second set of quantum bases. In some embodiments, this second set of quantum bases is different from the first set of quantum bases us. In other embodiments, the second set of quantum bases is not different from the first set of quantum bases, but the schedule governing which quantum basis is selected for decoding of which qbit is different than the schedule governing which quantum basis was selected for encoding of which of the original set of bits. The means for generating the second set of bits may be any suitable means, such as decoding circuitry 226 of apparatus 280, which is described previously with reference to FIG. 2E. The second set of bits thus have a probability of being different from the first set of bits. For example, as shown in the example provided in FIG. 3, the set of qbits may be decoded by the apparatus 280 based on alternative first and second quantum bases ("First," "Second," "First," "Second," "First," "Second," "First," "Second") to generate a set of bits ("10000010"), which includes two error bits (i.e., the second bit "0" and the sixth bit "0") when compared to an initial set of bits ("11000110").

As shown by operation 410, apparatus 200 thereafter includes means for generating a number based on the second set of bits. The means for generating the number may be any suitable means, such as RNG circuitry 212 described with reference to FIG. 2A. For example, the generated number may be the second set of bits ("10000010"). In another example, the generated number may be a number that includes the second set of bits in its entirety (e.g., "1000001000000000"). It will be understood that in embodiments where the apparatus 200 comprises a distinct apparatus from apparatus 280, an intervening operation may take place in which the apparatus 280 comprises means, such as classical communications circuitry 208, for transmitting the second set of bits to the apparatus 200 (and the apparatus 200 includes corresponding classical communications circuitry 208 for receiving the second set of bits).

Optionally, as shown by optional operation 412, the apparatus 200 includes means for generating a session key based on the generated number. The means for generating the session key may be any suitable means, such as RNG circuitry 212, PRNG circuitry 214, session authentication circuitry 216, QKD circuitry 218, or a combination thereof. For example, the PRNG circuitry 214 may be configured to use the generated number as a seed for pseudo-random number generation, and to generate a pseudo-random number based on the seed, and then to transmit the pseudo-random number to the session authentication circuitry 216. The session authentication circuitry 216 may receive the pseudo-random number and generate the session key based on the pseudo-random number. In some instances, session authentication circuitry 216 may receive a number directly from RNG circuitry 212 and may generate the session key based directly on the generated number. In this regard, in some embodiments, the generated number may be the session key. In other instances, the pseudo-random number may be the session key. In still other instances, the session authentication circuitry 216 may perform a transformation on the pseudo-random number (e.g., convolution with another variable, such as time) to arrive at the session key. In some instances, the decoded set of bits may comprise at least one error bit, and the session authentication circuitry 216 may generate the session key based at least in part on the at least one error bit. In some instances, the decoded set of bits may comprise at least one wildcard bit, and the session authentication circuitry 216 may generate the session key based at least in part on the at least one wildcard bit. In some embodiments, the session authentication circuitry 216 may then transmit the generated session key to a client device 110 (e.g., via invoking QKD circuitry 218 to effect secure transmission of the session key), and may thereafter use the generated session key to authenticate a session between two devices, such as between the client device 110 and another device (e.g., a server device 104 hosting a session accessed by the client device 110). Operation 412 is illustrated as optional insofar as the number generated in operation 410 may be used in theory for a variety of purposes, and not just within the context of session key generation.

As noted previously, there are many advantages of these and other embodiments described herein. In all cases, however, example embodiments of the present disclosure enhance the session authentication procedure by providing a session key that has truly random elements, which facilitate the generation of a session ID that cannot be reproduced by a third party.

In some embodiments, operations 402, 404, 406, 408, 410, and 412 may not necessarily occur in the order depicted in FIG. 4, and in some cases one or more of the operations depicted in FIG. 4 may occur substantially simultaneously, or additional steps may be involved before, after, or between any of the operations shown in FIG. 4.

FIG. 4 thus illustrates a flowchart describing the operation of various systems (e.g., session authentication system 102 described with reference to FIG. 1), apparatuses (e.g., apparatus 200 described with reference to FIG. 2), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 4 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for session authentication, the system comprising:
   decoding circuitry configured to
      receive, over a quantum line, a set of qbits generated based on a first set of quantum bases, and
      decode, based on a second set of quantum bases, the set of qbits to generate a decoded set of bits comprising at least one wildcard bit; and
   session authentication circuitry configured to
      generate a session key based on the decoded set of bits, wherein the session key is generated based at least in part on the at least one wildcard bit.

2. The system of claim 1, wherein the session authentication circuitry is configured to transmit the session key to a client device for use in session authentication by causing quantum key distribution circuitry to perform a quantum key distribution process that transmits the generated session key to the client device.

3. The system of claim 1, wherein the decoding circuitry is configured to decode at least one qbit of the set of qbits using a quantum basis that is different from a quantum basis used to generate the at least one qbit.

4. The system of claim 1, further comprising quantum basis determination circuitry configured to determine the second set of quantum bases using a pseudo-random selection method.

5. The system of claim 1, wherein the quantum line comprises an optical fiber, an optical waveguide, free space, or a combination thereof.

6. The system of claim 1, wherein the second set of quantum bases is different from the first set of quantum bases.

7. The system of claim 6,
wherein the first set of quantum bases comprises a first pair of orthogonal photonic polarization states, and
wherein the second set of quantum bases comprises a second pair of orthogonal photonic polarization states different from the first pair of orthogonal photonic polarization states.

8. The system of claim 7, wherein the first pair of orthogonal photonic polarization states and the second pair of orthogonal photonic polarization states are selected at least partially from the group consisting of a pair of rectilinear photonic polarization states, a pair of diagonal photonic polarization states, and a pair of circular photonic polarization states.

9. The system of claim 1, wherein the first set of first quantum bases or the second set of quantum bases comprises a plurality of quantum bases.

10. The system of claim 1, further comprising:
random number generation circuitry configured to generate a number based on the decoded set of bits,
wherein the session authentication circuitry is configured to generate the session key by
setting the session key equal to the generated number, or
using the generated number as a seed in a pseudo-random number generation procedure, wherein an output of the pseudo-random number generation procedure comprises the session key.

11. The system of claim 1, wherein the decoding circuitry is further configured to:
receive a control signal indicative of an instruction to decode the set of qbits based on the second set of quantum bases; and
in response to receiving the control signal, decode the set of qbits based on the second set of quantum bases.

12. The system of claim 1, wherein the decoding circuitry is further configured to not transmit second electronic information indicative of the second set of quantum bases.

13. The system of claim 1,
wherein the set of qbits is encoded based on a time-dependent qbit encoding schedule comprising a first plurality of quantum bases respectively corresponding to a first plurality of time periods, and
wherein the decoding circuitry is further configured to decode the set of qbits based on a time-dependent qbit decoding schedule comprising a second plurality of quantum bases respectively corresponding to a second plurality of time periods.

14. The system of claim 1, wherein the at least one wildcard bit has a probability of being decoded correctly that is different from its probability of being decoded incorrectly.

15. The system of claim 1, wherein the decoded set of bits comprises at least one error bit, and wherein the session key is generated based at least in part on the at least one error bit.

16. The system of claim 1, wherein a qbit decoder comprises the decoding circuitry, and wherein a separate session authentication system comprises the session authentication circuitry.

17. The system of claim 16, wherein the separate session authentication system comprises pseudo-random number generation circuitry configured to:
generate a seed for pseudo-random number generation based on a generated number; and
generate a pseudo-random number based on the seed,
wherein the session authentication circuitry is configured to generate the session key based on the pseudo-random number.

18. The system of claim 16, wherein the separate session authentication system comprises random number generation circuitry configured to:
generate a number based on the decoded set of bits,
wherein the session authentication circuitry is configured to generate the session key with a value equal to the generated number.

19. A method for session authentication, the method comprising:
receiving, by decoding circuitry and over a quantum line, a set of qbits generated based on a first set of quantum bases;
decoding, by the decoding circuitry and based on a second set of quantum bases, the set of qbits to generate a decoded set of bits comprising at least one wildcard bit; and
generating, by session authentication circuitry, a session key based on the decoded set of bits, wherein the session key is generated based at least in part on the at least one wildcard bit.

20. A computer program product for session authentication, the computer program product comprising at least one non-transitory computer-readable storage medium storing program instructions that, when executed, cause an apparatus to:
receive, over a quantum line, a set of qbits generated based on a first set of quantum bases;
decode, based on a second set of quantum bases, the set of qbits to generate a decoded set of bits comprising at least one wildcard bit; and
generate a session key based on the decoded set of bits, wherein the session key is generated based at least in part on the at least one wildcard bit.

* * * * *